(12) United States Patent
Gu

(10) Patent No.: US 10,817,056 B2
(45) Date of Patent: *Oct. 27, 2020

(54) HAND EXOSKELETON FORCE FEEDBACK SYSTEM

(71) Applicant: Dexta Robotics, Nanjing (CN)

(72) Inventor: Xiaochi Gu, Nanjing (CN)

(73) Assignee: Shenzhen Dexta Robotics Co. Ltd. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,971

(22) Filed: Sep. 13, 2019

(65) Prior Publication Data

US 2020/0050269 A1    Feb. 13, 2020

Related U.S. Application Data

(63) Continuation-in-part of application No. 15/155,220, filed on May 16, 2016, now Pat. No. 10,423,227.
(Continued)

(30) Foreign Application Priority Data

Jul. 21, 2014    (CN) .......................... 2014 1 0346346

(51) Int. Cl.
*G06F 3/0338*    (2013.01)
*G06F 3/01*    (2006.01)
*B25J 9/00*    (2006.01)

(52) U.S. Cl.
CPC ............ *G06F 3/014* (2013.01); *B25J 9/0006* (2013.01); *G06F 3/016* (2013.01)

(58) Field of Classification Search
CPC .......... G06F 3/016; G06F 3/014; G06F 3/017; G06F 3/0346; G06F 3/03547;
(Continued)

(56) References Cited

U.S. PATENT DOCUMENTS 5,354,162 A    10/1994 Burdea
5,888,213 A *    3/1999 Sears ........................ A61F 2/68
                                                          623/24
(Continued)

FOREIGN PATENT DOCUMENTS

EP    2345951    7/2011
WO    2012081402    6/2012

OTHER PUBLICATIONS

Control VR: Downloaded on Dec. 18, 2014 from https://www.controlvr.com, Prior art at least as of Aug. 13, 2014.
(Continued)

*Primary Examiner* — Hai Phan
*Assistant Examiner* — Anthony D Afrifa-Kyei

(57) ABSTRACT

This disclosure includes a force feedback system. In some embodiments, the system includes a base, a microcontroller communicatively coupled to a computing device, a thumb force feedback unit, and four finger force feedback units. The thumb force feedback unit may be configured to capture thumb motion and provide force feedback according to input from the computing device. Additionally, each of the four finger force feedback units may be configured to capture finger motion and provide force feedback according to input from the computing device. In some embodiments, the system includes at least one vibrational actuator configured to produce a physical stimulus.

20 Claims, 33 Drawing Sheets

Related U.S. Application Data which is a continuation-in-part of application No. 14/459,594, filed on Aug. 14, 2014, now Pat. No. 9,342,151.

(58) Field of Classification Search
CPC ............ G06F 3/038; G06F 2203/0331; G06F 2203/0384; G06F 3/0202; G06F 3/0338; G06F 3/0362; G06T 19/006; G08B 6/00; A63F 13/211; A63F 13/235; A63F 13/24
See application file for complete search history.

(56) References Cited

U.S. PATENT DOCUMENTS

| | | | |
|---|---|---|---|
| 5,912,658 A | 6/1999 | Bergamasco | |
| 6,042,555 A | 3/2000 | Kramer | |
| 7,138,976 B1 | 11/2006 | Bouzit | |
| 7,862,522 B1 | 1/2011 | Barclay | |
| 9,072,616 B2* | 7/2015 | Schulz | A61F 2/70 |
| 9,084,690 B2 | 7/2015 | Pedersen | |
| 9,104,271 B1 | 8/2015 | Adams | |
| 9,652,037 B2 | 5/2017 | Rubin | |
| 2003/0223844 A1 | 12/2003 | Schiele | |
| 2006/0267932 A1 | 11/2006 | Rosenberg | |
| 2007/0035143 A1* | 2/2007 | Blackwell | B25J 15/0009 294/111 |
| 2008/0300521 A1* | 12/2008 | Karkanias | A61F 5/01 602/2 |
| 2009/0048539 A1* | 2/2009 | Lundborg | A61F 2/68 600/595 |
| 2010/0041521 A1 | 2/2010 | Ingvast | |
| 2010/0134327 A1 | 6/2010 | Dihn | |
| 2010/0234182 A1 | 9/2010 | Hoffman | |
| 2011/0234483 A1 | 9/2011 | Lan | |
| 2011/0282253 A1 | 11/2011 | Menon | |
| 2012/0025945 A1 | 2/2012 | Yazadi | |
| 2013/0278500 A1 | 10/2013 | Kawasaki | |
| 2014/0077929 A1 | 3/2014 | Dumas | |
| 2014/0232646 A1 | 8/2014 | Biggs | |
| 2015/0065831 A1* | 3/2015 | Popovic | A61B 5/0022 600/339 |
| 2015/0351935 A1* | 12/2015 | Donati | A61F 2/72 623/25 |
| 2016/0278947 A1* | 9/2016 | Martin | A61B 5/4851 |

OTHER PUBLICATIONS

Leap Motion: Downloaded on Dec. 18, 2014 from https://www.leapmotion.com/product, Prior art at least as of Aug. 13, 2014.

Cyberglove II data sheet: Downloaded on Dec. 18, 2014 from https://www.cyberglovesystems.com/products/cyberglove-II/overview, Prior art at least as of Aug. 13, 2014.

Cyberglove III data sheet: Downloaded on Dec. 18, 2014 from https://www.cyberglovesystems.com/products/cyberglove-III/overview, Prior art at least as of Aug. 13, 2014.

* cited by examiner

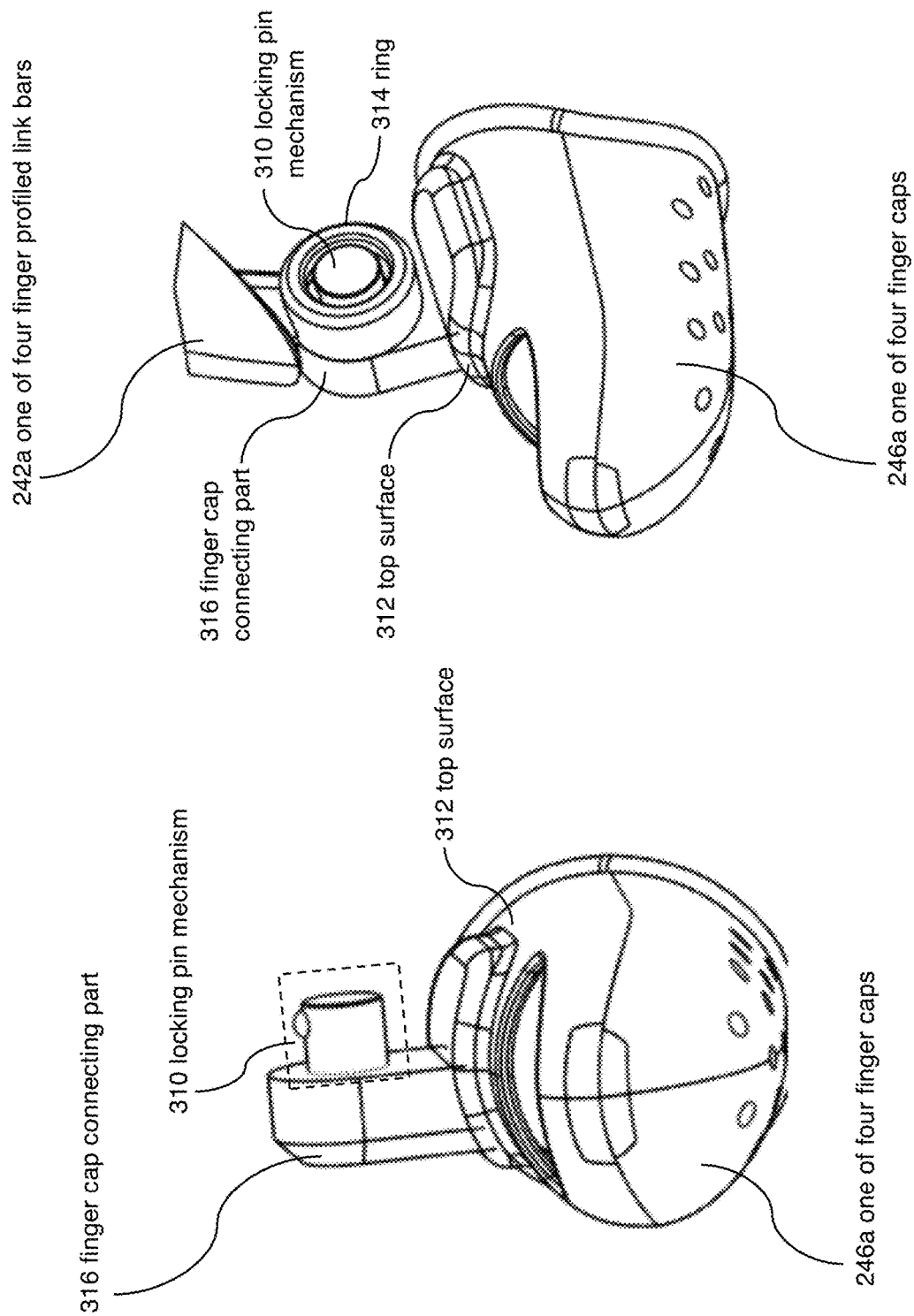

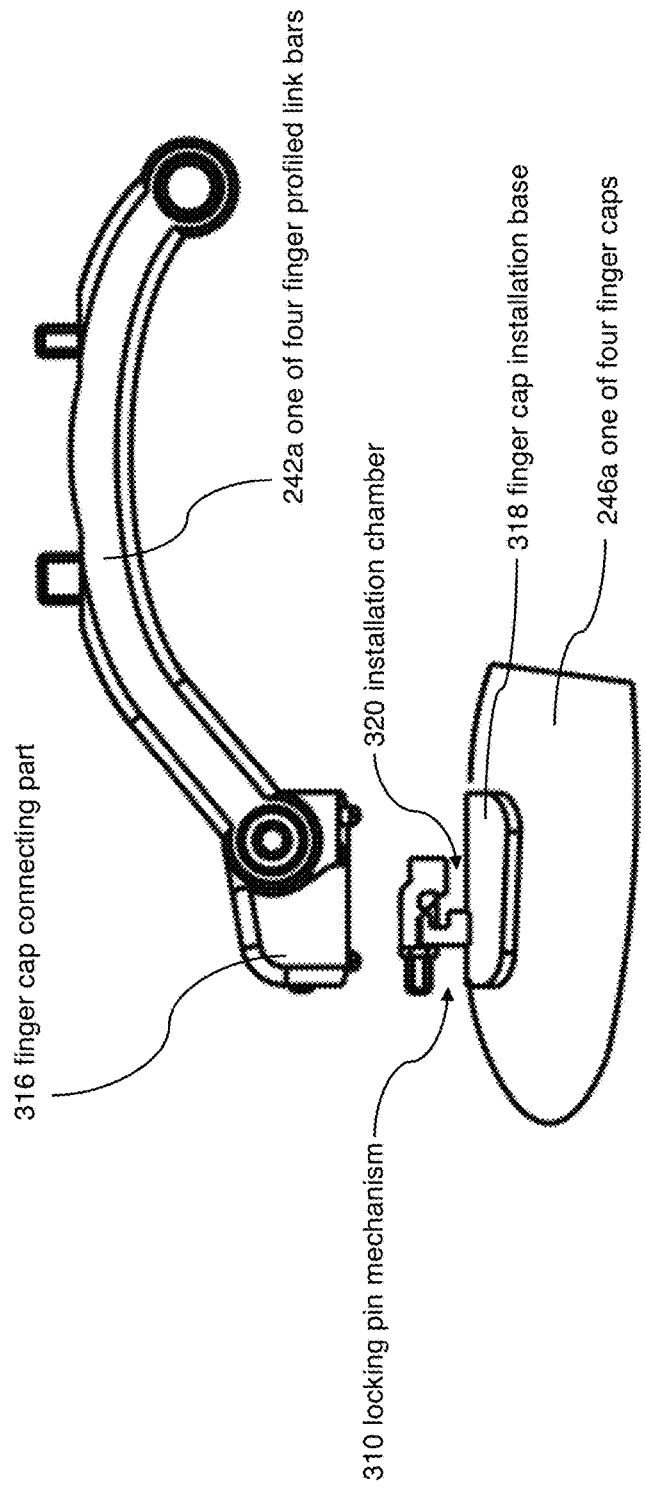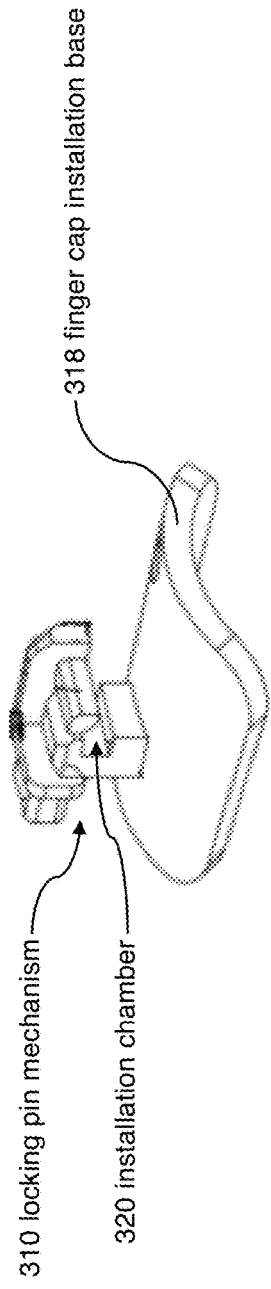
Figure 28A
Figure 28B

HAND EXOSKELETON FORCE FEEDBACK SYSTEM

CROSS-REFERENCE TO RELATED APPLICATIONS

This application claims the benefit of and is a continuation-in-part of U.S. patent application Ser. No. 15/155,220; filed May 16, 2016; and entitled HAND EXOSKELETON FORCE FEEDBACK SYSTEM. The entire contents of U.S. patent application Ser. No. 15/155,220 are incorporated herein by reference.

U.S. patent application Ser. No. 15/155,220 claims the benefit of and is a continuation-in-part of U.S. patent application Ser. No. 14/459,594; filed Aug. 14, 2014; and entitled HAND MOTION-CAPTURING DEVICE WITH FORCE FEEDBACK SYSTEM. The entire contents of U.S. patent application Ser. No. 14/459,594 are incorporated herein by reference.

U.S. patent application Ser. No. 14/459,594 claims the benefit of Chinese Patent Application Serial No. 201410346346.7; filed Jul. 21, 2014; and entitled A HAND MOTION-CAPTURING DEVICE WITH A FORCE FEEDBACK SYSTEM USING A MECHANICAL APPROACH. The entire contents of Chinese Patent Application Serial No. 201410346346.7 are incorporated herein by reference.

BACKGROUND

Field

Various embodiments disclosed herein relate to an implementation for a force feedback method of an exoskeleton system, with applications in augment reality or virtual reality and robot control.

Description of Related Art

There are currently a number of hand-motion capturing solutions. Some existing solutions use camera and computer vision technologies to analyze the shape and direction of a hand. Three hand-motion-capturing approaches use optical capturing, IMU (inertia measurement unit) capturing and bending sensor (i.e. Flex sensors) capturing.

Among devices that use the optical capturing approach, a device called the "Leap Motion Controller", from Leap Motion, Inc., uses an infrared camera to track motion of hands and utilizes algorithms to fuse data from the camera. However, some disadvantages are commonly seen in devices that use computer vision to track the motion of the hand. The ability of these devices to track hand motion is restricted due to the camera's limited monitoring scope and direction. These devices are not capable of generating a correct hand model when a user's hand is out of the camera's monitoring scope. Furthermore, an optical-capturing-based solution is unable to offer force feedback without incorporating an additional wearable device.

Another device called the "Control VR", from Control VR, uses IMU to measure the offset angle of each finger. A disadvantage of the IMU device is the need to recalibrate the zero-offset each time the device is placed in a new magnetic environment, and that it loses accurate tracking when placed in a strong magnetic field. Additionally, because this approach involves installing drivers on the back of the user's hand, implementing force feedback is more difficult. Moreover, this approach uses bending sensors, such as a strain gauge, installed on a glove to capture hand motion. However, this approach is not able to accurately provide measurements because of the non-linear relationship between sensor readings and bending of finger. As well, it is difficult to implement force-feedback with this approach due to similar reasons as with the IMU approach. Bending sensors based approach, similar to the IMU approach, is unable to offer exact coordinates to describe finger positions due to their principles of measurements.

Early attempts to implement haptic interfaces for human hands include the PHANTOM, which measures users' hand position with a grounded robotic arm and exerts controlled point force vector on users' hand. PHANTOM achieved precise stiffness control by adjusting the torque of three DC brushed motors with encoders. This technology is essentially a transmission between the motors and the human hand. Therefore the workspace for the user and the mobility is highly limited. Moreover, this system fails to produce feedback for individual fingers, reducing the credibility of the haptic experience. The Rutgers Master II ND utilizes pneumatic actuators arranged in center of palm and achieves force feedback by directly driving the fingers. This device uses the non-contact Hall effect and IR sensors for motion capturing for durability reasons, yet this approach raises manufacture costs. Specifications of the RMII-ND haptic glove are comparable to those of the CyberGrasp, another well-known haptic glove system. CyberGrasp uses resistive bend sensors for motion capturing. This system uses a DC motor and cable-pulley transmissions on an exoskeleton to pull users' finger backward in order to simulate the exerted force. Primarily intended for corporations, such as military and medical rehabilitation, CyberGrasp system is not a consumer-grade product. While these two systems are capable of offering precise force control, they are large in size and expansive due to the complexity of the design. Other systems include Haptic Telexistence, HIRO III (Japanese robotics system) and RML Glove.

SUMMARY

Several embodiments can include a hand motion-capturing device with a force feedback system. The device includes a base, a microcontroller connected to the base, and a thumb sensor module and four-finger sensor modules each electrically connected to the microcontroller. The device also includes five link rods. Each of the five link rods interconnects the thumb sensor module to the base and each of the four-finger sensor modules to the base. The device also includes a thumb force feedback system adapted and configured to receive a human thumb. The thumb force feedback system is movably connected to the link rod and the thumb sensor module. As well, the device includes a four-finger force feedback system adapted and configured to receive an index finger, a middle finger, a ring finger, and a little finger, wherein the four-finger force feedback system is movably connected to the link rod and the four-finger sensor modules.

Several embodiments can include two different force feedback implementations of a motion capturing hand exoskeleton. These two implementations for the force feedback unit each include a motor, a mechanical transmission system, a microcontroller and a rotation sensor.

Each hand exoskeleton system may use five force feedback unit. The thumb force feedback system is movably connected to the link rod and the thumb sensor module. As well, the exoskeleton system includes a four-finger force feedback system adapted and configured to receive an index finger, a middle finger, a ring finger, and a little finger, wherein the four-finger force feedback system is movably connected to the link rod and the four-finger sensor modules.

Several embodiments can include a force feedback device with a force feedback system. The force feedback device with a force feedback system includes: an exoskeleton configured to receive a hand of a user, a base, a force feedback unit, and a microcontroller. Wherein the force feedback unit is coupled to the base of the exoskeleton and the microcontroller.

Some embodiments may include one or more of the following. The force feedback unit may be mechanically coupled to the base. The force feedback unit may be electronically coupled to the microcontroller. The force feedback unit may be a first force feedback unit, and the force feedback device may further comprise a second force feedback unit, a third force feedback unit, a fourth force feedback unit, and a fifth force feedback unit. Each of the first force feedback unit, second force feedback unit, third force feedback unit, fourth force feedback unit, and fifth force feedback unit correspond to the five fingers of a hand. The force feedback unit may be mechanically coupled to the base with a bar. The force feedback device may be configured to capture hand motion. The exoskeleton may be a motion capturing device. The exoskeleton may be configured to interface with a motion capturing device.

Several embodiments may include one or more of the following. The force feedback device may further comprise at least one finger cap. The force feedback unit may be mechanically coupled to the finger cap. The force feedback unit may be mechanically coupled to the finger cap with a profiled bar. The force feedback device may further comprise a rotation sensor. The microcontroller may be a first microcontroller; and may further comprise a second microcontroller.

Several embodiments may include one or more of the following. The force feedback unit is a side-locking mechanism. The side-locking mechanism may comprise a first profiled gear ring, an upper link bar, a second profiled gear ring, a lower link bar, a linear actuator slider module, a first profiled anti-shaped-gear, a second profiled anti-shaped-gear, and a worm gear. It should be appreciated that the linear actuator slider can be any kind of linear actuator, i.e. a linear solenoid, or a rotational solenoid with a worm gear, which transform its rotational movement into linear movement. Wherein the first profiled gear ring may be mechanically coupled to the upper link bar. The second profiled gear ring may be mechanically coupled to the lower link bar. The first profiled anti-shaped-gear may be coupled to the linear actuator slider module and the second profiled anti-shaped-gear may be coupled to the linear actuator slider module via the worm gear. The first profiled gear ring may be configured to mesh with the first profiled anti-shaped-gear and the second profiled gear ring may be configured to mesh with the second anti-shaped-gear. The first profiled gear ring and the second profiled gear ring are identical. The linear actuator slider module comprises a motor and a transmission gear box. The force feedback unit is a direct drive motor system. The force feedback device may further comprise a torque output arm. The microcontroller may be configured to regulate torque output of the direct drive motor system. The direct drive motor system may be a servo motor. The direct drive motor system may be configured to act as an electronic spring.

In some embodiments, the exoskeleton is adjustable to fit different hand sizes. As well, in some embodiments, the system includes an output arm cap that is adjustable to fit different finger lengths and hand sizes. The exoskeleton can also include at least one of a button and a means of user control whereby the button and the means of user control are configurable to receive input from a user. For example, in some embodiments, the user control includes at least one button, dial, joystick, or other means of "user control".

Many embodiments include a force feedback system including a base, a microcontroller coupled to the base and communicatively coupled to a computing device, a thumb force feedback unit mechanically coupled to the base and communicatively coupled to the microcontroller, the thumb force feedback unit may be configured to capture thumb motion and provide force feedback according to input from the computing device. The system may also include four finger force feedback units each mechanically coupled to the base and communicatively coupled to the microcontroller. Each of the four finger force feedback units may be configured to capture finger motion and provide force feedback according to input from the computing device. The system may also include at least one vibrational actuator communicatively coupled to the microcontroller, the at least one vibrational actuator configured to produce a physical stimulus.

In some embodiments, the base comprises an exoskeleton arranged and configured to move with a human hand and capture motion of the human hand. The at least one vibrational actuator may include a vibrational motor communicatively coupled to a driving chip, wherein the driving chip is configured to send a signal to the at least one vibrational actuator. In some embodiments, the signal comprises a vibration waveform and the physical stimulus comprises vibration.

The at least one vibrational actuator may be coupled to at least one of the base, a thumb profiled link bar coupled to the thumb force feedback unit, at least one of four finger profiled link bars, each of the four finger profiled link bars coupled to one of the four finger force feedback units, a thumb cap coupled to the thumb force feedback unit, at least one of four finger caps, each of the four finger caps coupled to one of the four finger force feedback units, and a palm surface of the system. The system may be configured to provide vibration to at least one of a finger tip, a thumb tip, a palm of a hand, and a backside of the hand. In some embodiments, the vibration varies in at least one of amplitude, duration, waveform type, and frequency.

In some embodiments, when the at least one vibrational actuator is coupled to the palm surface of the system, the at least one vibrational actuator is located within a soft sleeve detachably coupled to the system. The at least one vibrational actuator may be at least one of adhered to, detachably coupled to, and integrated into at least one of the base, the thumb profiled link bar, the at least one of four finger profiled link bars, the thumb cap, and the at least one of four finger caps.

In many embodiments, a force feedback system comprises a base, a microcontroller coupled to the base and communicatively coupled to a computing device, a thumb force feedback unit mechanically coupled to the base and communicatively coupled to the microcontroller whereby the thumb force feedback unit is configured to capture thumb motion and provide force feedback according to input from the computing device, a thumb cap detachably coupled to the thumb force feedback unit, four finger force feedback units each mechanically coupled to the base and communicatively coupled to the microcontroller whereby each of the four finger force feedback units are configured to capture finger motion and provide force feedback according to input from the computing device, and four finger caps each detachably coupled to each of the four finger force feedback units.

The thumb force feedback unit may comprise a thumb housing, a thumb rotational sensor, a thumb microcontroller, a thumb transmission gear box, a thumb motor, a thumb vibrational actuator, a thumb torque output arm, and a thumb profiled link bar. The four finger force feedback units may comprise four finger housings, four rotational sensors, four finger microcontrollers, four finger transmission gear boxes, four finger motors, four finger vibrational actuators, four finger torque output arms, and four finger profiled link bars. In some embodiments, the system further comprises a thumb joint mechanically coupled to the base and the thumb force feedback unit such that the thumb joint is located between the thumb force feedback unit and the base. The thumb joint may be configured to rotate up and down with respect to the base and restricted from rotating side to side with respect to the base. The thumb force feedback unit may be configured to rotate side to side with respect to the thumb joint and restricted from rotating up and down with respect to the thumb joint. The thumb force feedback unit may be configured to rotate both side to side and up and down with respect to the base.

In some embodiments, the thumb torque output arm is coupled to the thumb force feedback unit and is configured to rotate up and down with respect to the thumb force feedback unit and restricted from rotating side to side with respect to the thumb force feedback unit. The four finger torque output arms may be coupled to the four finger force feedback units and may be configured to rotate up and down with respect to each of the four finger force feedback units and restricted from rotating side to side with respect to each of the four finger force feedback units.

The thumb profiled link bar may be coupled to the thumb torque output arm and may be configured to rotate up and down with respect to the thumb torque output arm and restricted from rotating side to side with respect to the thumb torque output arm. The four finger profiled link bars may be coupled to the four finger torque output arms and may be configured to rotate up and down with respect to the four finger torque output arms and restricted from rotating side to side with respect to the four finger torque output arms. In some embodiments, the thumb profiled link bar is configured to slide with respect to the thumb torque output arm and restricted from rotating with respect to the thumb torque output arm, and the four finger profiled link bars are each configured to slide with respect to the four finger torque output arms and are restricted from rotating with respect to the four finger torque output arms.

In some embodiments, the thumb cap is detachably coupled to the thumb profiled link bar and is configured to rotate up and down with respect to the thumb profiled link bar and restricted from rotating side to side with respect to the thumb profiled link bar, and the four finger caps are detachably coupled to each of the four finger profiled link bars and are configured to rotate up and down with respect to the four finger profiled link bars and restricted from rotating side to side with respect to the four finger profiled link bars. The thumb cap may be configured to at least partially enclose a thumb of a user and the four finger caps may be configured to at least partially enclose four fingers of the user.

The thumb cap may be detachably coupled to the thumb profiled link bar via at least one of a friction fit, a screw, and a magnet, and the four finger caps may be detachably coupled to the four finger profiled link bars via at least one of the friction fit, the screw, and the magnet. In some embodiments, the friction fit comprises a locking pin mechanism coupled to a top surface of the thumb cap and the four finger caps, wherein the locking pin mechanism mechanically couples to a ring coupled to the thumb profiled link bar and the four finger profiled link bars. In many embodiments, the thumb cap and the four finger caps comprise a variety of sizes configured to fit a variety of users.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

FIGS. 26A and 26B illustrate perspective views of a finger cap showing the finger cap being detachable from the force feedback system, according to some embodiments.

FIGS. 28A and 28B illustrate perspective views of a locking pin mechanism of a finger cap, according to some embodiments.

DETAILED DESCRIPTION

Figure 1:
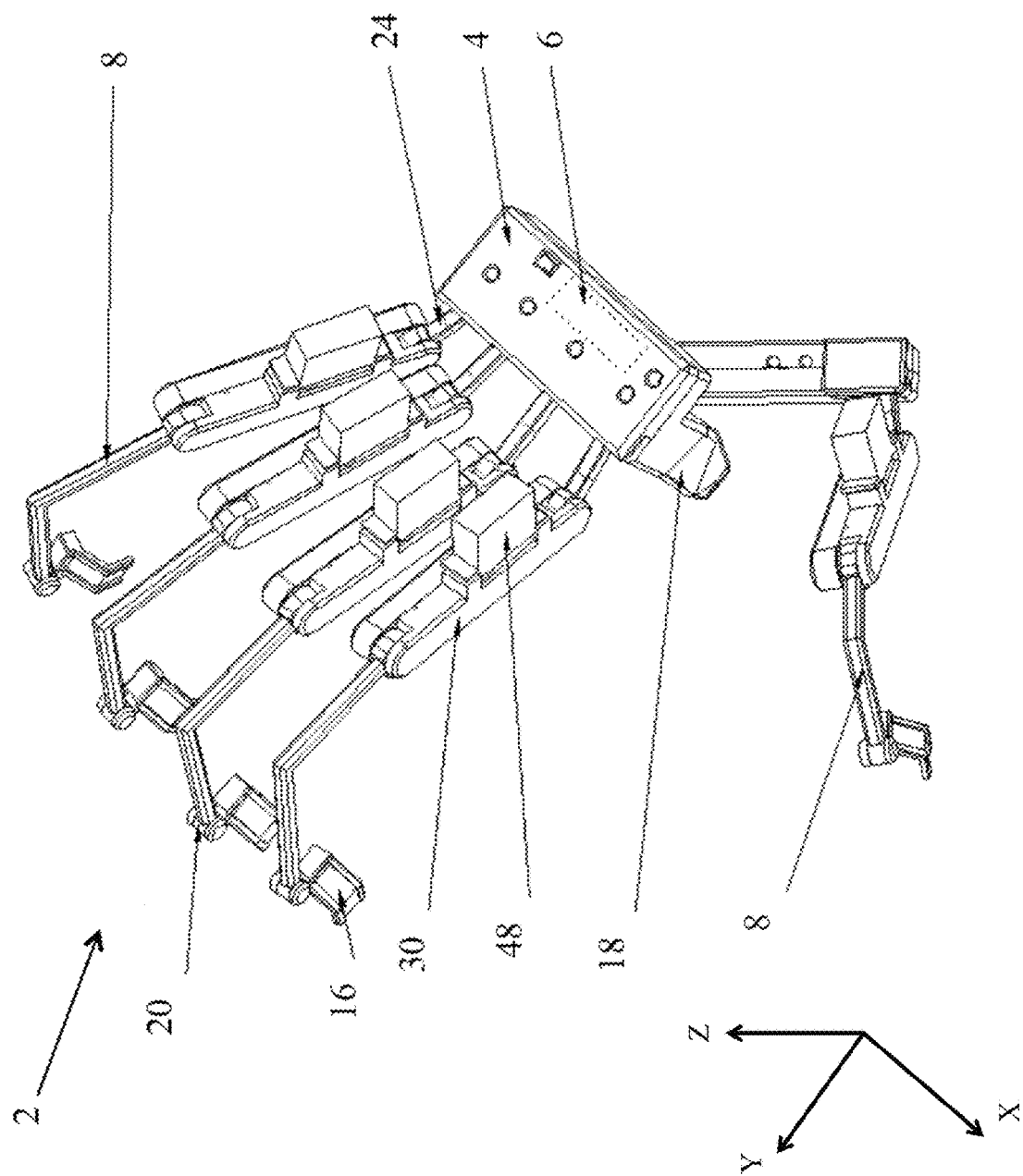
FIG. 1 illustrates a perspective view of a device, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Force feedback solutions. Particularly, this disclosure may offer a compact force feedback unit design for portable force-feedback system. All force feedback solutions this disclosure will present is based on the original design of the hand motion capturing exoskeleton (see U.S. patent application Ser. No. 14/459,594). The gesture of the users' hand will be measured and this disclosure may offer more robust/versatile force feedback according to these readings. These force feedback experiences along with the hand gesture measurements can be used in augmented/virtual reality experiences, gaming, robotics control and other mechanical control. The force feedback unit may provide computer-controlled on-and-off rigid force feedback. Some force feedback unit implementations may also provide computer-controlled resistance, to create different levels of springiness, which may effectively simulate the user feeling the object not existing in his or her presence. For example the user can tell the difference between a stone and a balloon purely by squeezing with their fingers.

In some examples, a user may use this device to control a robot to perform a bomb disposal task from one kilometer distance from the bomb's location. The user can remotely control a robot hand to grasp explosives by moving the hand of the user. At the instant that the object is grasped in position, self-locking mechanisms may be signaled to lock the rotation joint in a fixed position in order to generate a feel of grasping, or the force feedback servo will perform position based impedance control to generate a feel of grasping with softness feedback. Previously, this operation may have required multiple cameras to locate the object. However, with this invention, a user may only use one camera and the sense of touch to locate the object. With the use of head-mounted display (such as Oculus Rift, Sony Morpheus, or HTC Vive), users may be more effective in bomb disposal.

In some examples, such as augmented/virtual/mixed reality gaming, users may use a head-mounted display to see both of their hands in a virtual world. When the user tries to grasp a virtual object (virtual object in augmented reality (real life) or virtual reality (virtual world)), software embodiments of this disclosure will analyze the coincidence of a hand model and an object model and signal the force feedback mechanism on the device to simulate computer-controlled force. The locking effect or the impedance controlled motor force feedback may produce pressure on the fingertips of the user. The pressure, in turn, creates a sense of touching that may simulate the sense of grasping an object in the real world. It is even possible for the force feedback to simulate force of different levels, and the sense may offer life-like experience for games and may add to the extension of games. In order to solve the technological problems described above, embodiments described in this disclosure may utilize a hand-motion-capturing device using a mechanical approach and capable of offering force feedback.

In order to solve the technological problems described above, embodiments described in this disclosure may utilize a two different force feedback approaches for a hand-motion-capturing device. By combining with virtual or real time graphics, the device may provide timely force-feedback to users' finger to create higher immersion experiences when installed to a hand-motion-capturing device (see U.S. patent application Ser. No. 14/459,594).

The hand-motion-capturing structures may utilize multiple types of sensors and structures integrated with connecting rods and thereby track the users' precise hand motion. These signals data is then transmitted to a simulated virtual hand controlled by this device for collision detection. Once the virtual hand touches a digital object, the collision signal will be sent back to the device and the replaceable force feedback units. Then the force feedback units activates and exert forces on to users' fingertips via connecting rods and caps.

Currently available methods include the use of string-pulley system, string-ball screw linear actuator system and other components of high cost. Since these solutions require string to transmit force and typically hand motors at the back end, they tend to also have high weight, complex structure and low maintainability.

Because the force feedback unit is mechanically jointed to the users' finger, with the motor and transmission unit enclosed inside the force feedback unit, the force feedback device can provide much rigid force output while being modular and easily replaceable.

The force feedback system may obstruct the rotation of the rotational joint with resistance by transmitting a profiled gear via an executional element (such as a servo motor, etc.) to push the rack to slide to two sides. In some embodiments, the system may obstruct the rotation by plugging the profiled gear into the ratchet ring wheel of the rotational joint using a linear actuator. In yet some embodiments, the system may use a profiled motor driven servo unit to perform impedance control to directly change the torque output, which may generate a sense of gripping for the user.

This invention may revolutionize how people interact with 3D objects. When using in conjunction with an augmented reality, virtual reality, or mixed reality headset, people could manipulate data and objects in 3D and feel them, this greatly increases immersion as well as precision. Industrial designers can view and move parts of a car model, rocket scientists could explore into their design. The device could also be used to control a robot hand and thereby feel the feedback. For users in the field of art and music, this invention can be used to perform an innovative art form.

COMPONENT INDEX

2—device (force feedback unit)
2a—force feedback device
4—base
6—microcontroller
8—profiled linked rods
8a—profiled linked rods
10—first potentiometer
10a—four first potentiometers
12—second potentiometer
12a—four second potentiometers
14—fourth potentiometer
14a—fourth potentiometer
16—finger cap
18—five link rods
20—connection bolts
20a—connection bolts
22—third potentiometer
24—straight rods
26—first rotational joint
28—second rotational joint
30—case
32—profiled gear
34—first rack
36—second rack
38—slide track
40—spark
42—plurality of ratchets
44—resistance or friction brick
46—U-shaped slot
48—drive system
50—fifth potentiometer
50a—fifth potentiometer
52—sixth potentiometer
52a—sixth potentiometer
54—seventh potentiometer
100—base
101—device (force feedback unit)
102—base of hand-motion-capturing exoskeleton
103—main microcontroller
104—right half shell
105—left half shell
106—upper link bar
107—profiled lower link bar
108—finger cap
109—microcontroller
110—rotation sensor
111—profiled gear ring (upper)
112—profiled anti-shaped-gear
113—linear actuator slider module
114—profiled anti-shaped-gear slider
114—finger cap (FIG. 20)
115—profiled gear ring (lower)
116—motor
117—transmission gear box
118—spring
119—worm gear
120—device (force feedback unit)
121—upper link bar
122—torque output arm
122a—cap
123—profiled lower link bar
124—transmission gear box
125—motor
126—microcontroller
127—rotation sensor
128—glove
129—strip
130—palm strip
131—user controls/one or more buttons
132—joystick
133—external piece
210—force feedback system
212—base
214—microcontroller
218—thumb force feedback unit
220—four finger force feedback units
220a—one of four finger force feedback units
222—at least one vibrational actuator
226—exoskeleton
228—human hand
240—thumb profiled link bar
242—four finger profiled link bars
242a—one of four finger profiled link bars
244—thumb cap
246—four finger caps
246a—one of four finger caps
250—finger tip
252—thumb tip
255—palm strap
256—backside of the hand
266—soft sleeve
280—thumb torque output arm
294—four finger torque output arms
294a—one of four finger torque output arms
296—thumb joint
310—locking pin mechanism
312—top surface
314—ring
316—finger cap connecting part
318—finger cap installation base
320—installation chamber With specific reference to FIG. 1, some embodiments of the device 2 may include a base 4, a microcontroller 6 connected to the base 4, a thumb sensor module and four-finger sensor modules each electrically connected to the microcontroller 6. The base 4 may be attached to the back of the hand via a connection element. As well, the microcontroller 6 may be attached to the base 4 and electrically connected to the exoskeleton of the five fingers (the thumb sensor module and the four-finger sensor module). Data may be collected by the microcontroller 6 and transmitted via wires in the finger exoskeletons to the base 4. In this manner, the hand joint can twist without restriction, and thus hand movements may achieve increased flexibility and precision.

The device 2 may also include five link rods 18, whereby each of the five link rods 18 interconnects the thumb sensor module to the base 4 and each of the four-finger sensor modules to the base 4. In some embodiments, the device 2 may include a thumb force feedback system adapted and configured to receive a human thumb. The thumb force feedback system may be movably connected to the link rod 18 and the thumb sensor module. As well, in some embodiments, the device 2 may include a four-finger force feedback system adapted and configured to receive an index finger, a middle finger, a ring finger, and a little finger. The four-finger force feedback system may be movably connected to the link rod 18 and the four-finger sensor modules. It should be appreciated that the fingers may be human fingers, or fingers belonging to any mammal, such as a gorilla.

Figure 2:
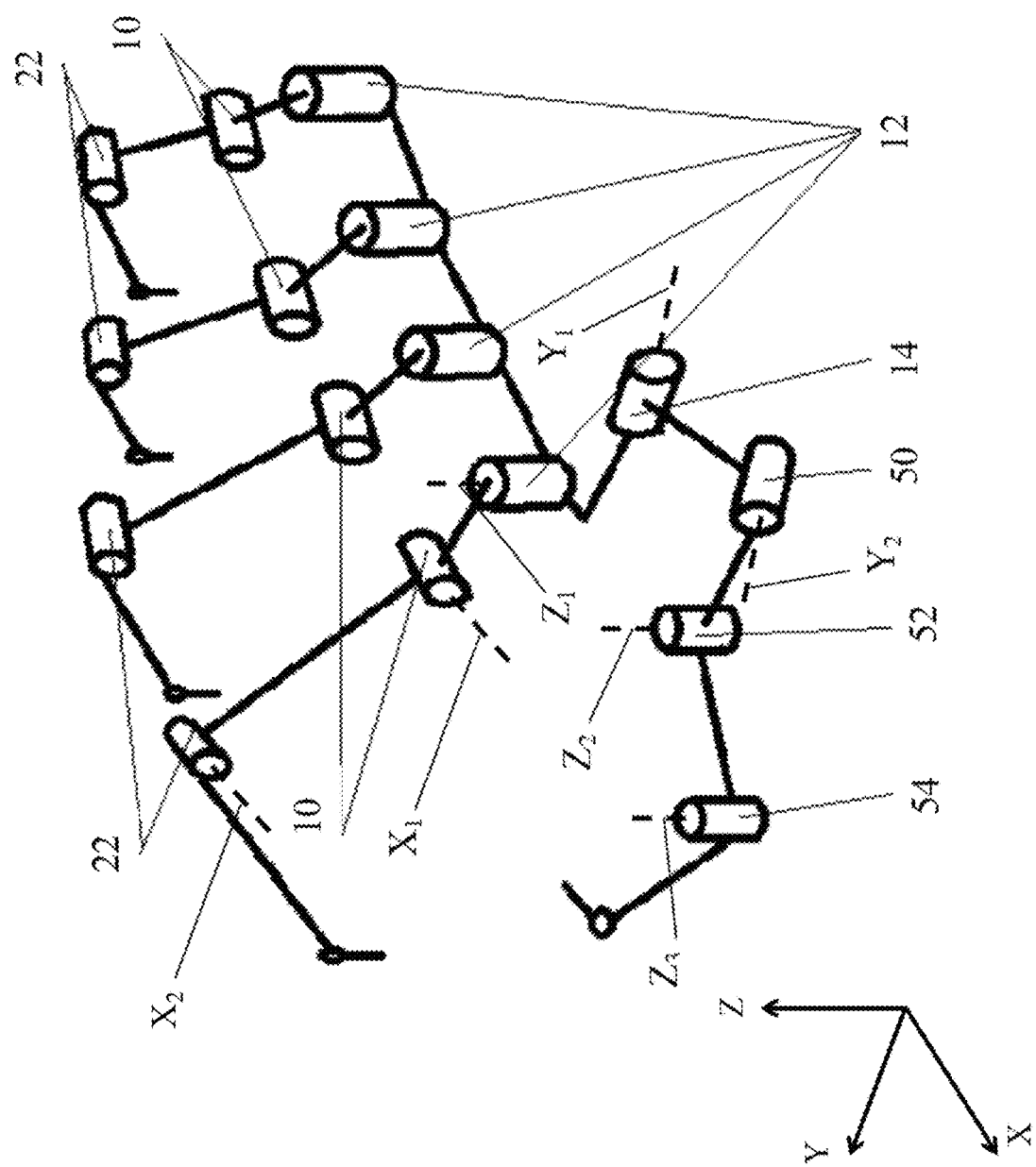
FIG. 2 illustrates a perspective view of a schematic of a device, according to some embodiments.
Figure 3:
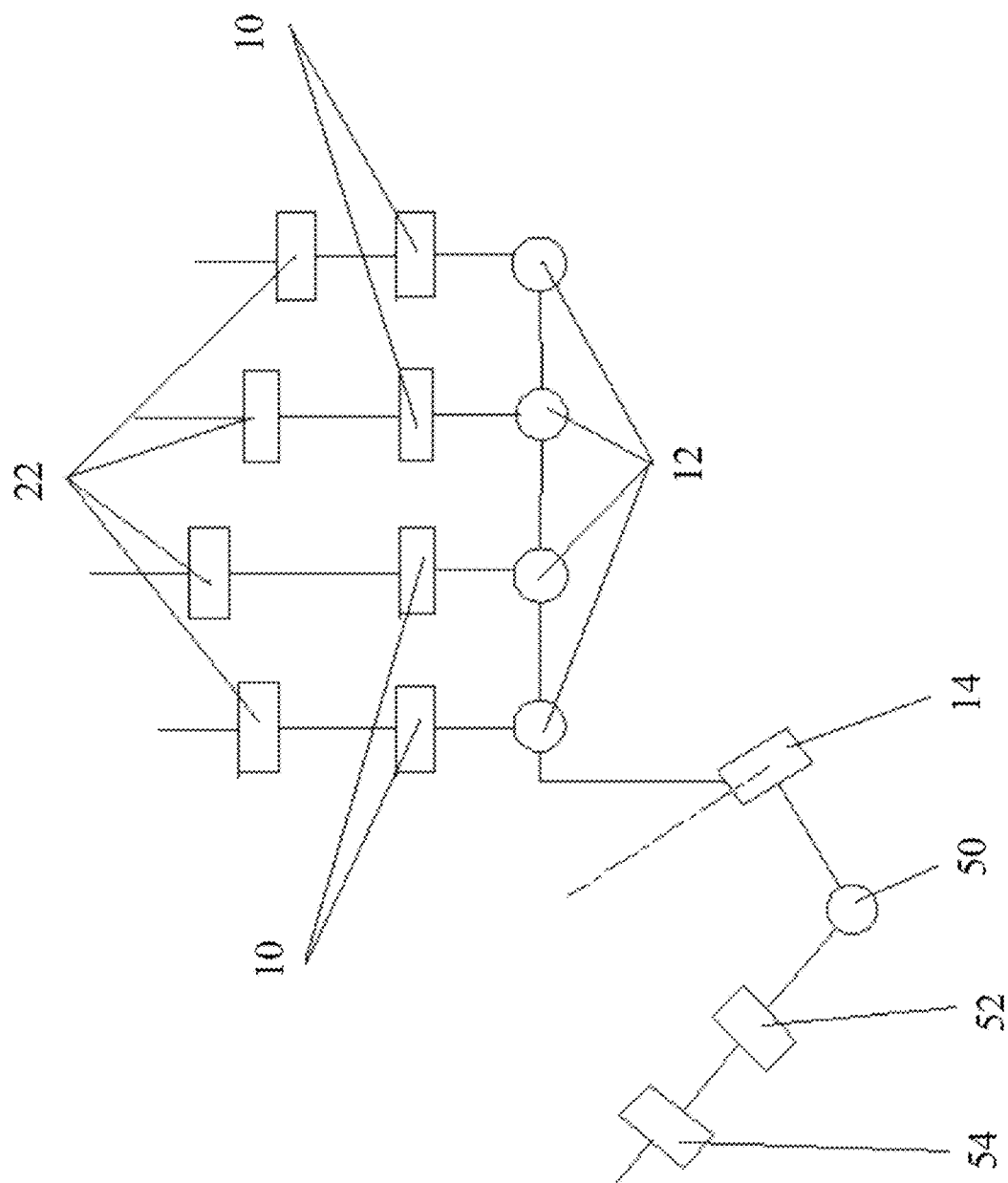
FIG. 3 illustrates a top view of a schematic of a device, according to some embodiments.

As shown in FIGS. 2 and 3, the base 4 may include a bottom plane that extends along a first direction X and a second direction Y that is perpendicular to the first direction X. The four-finger sensor modules may each include four pairs of perpendicularly connected first and second potentiometers 10 and 12. The four second potentiometers 12 may be disposed on the base 4 with the axes $Z_1$ being parallel to a third direction Z that is perpendicular to the first and second directions X and Y, such that they are perpendicular to the bottom plane of the base 4. The system may also include four third potentiometers 22. Each of the third potentiometers 22 may be connected to a first potentiometer 10 through the four-finger force feedback system, and parallel with the first potentiometer's axis $X_1$, which may also parallel with the third direction Z. It should be appreciated that any number of first, second, and/or third potentiometers 22 above or below four, may be used in the system.

With continued reference to FIGS. 2 and 3, the thumb force sensor module may include sequentially connected fourth potentiometer 14, fifth potentiometer 50, and sixth potentiometer 52. The fourth potentiometer's axis $Y_1$ may be parallel to the fifth potentiometer's axis $Y_2$. The sixth potentiometer's axis $Z_2$ may be perpendicular to each of the fourth potentiometer's axis $Y_1$ and the fifth potentiometer's axis $Y_2$. As well, there exists a seventh potentiometer 54 connected with the sixth potentiometer 52 through the thumb force feedback system. Additionally, the seventh potentiometer's axis $Z_3$ may be parallel to the sixth potentiometer's axis $Z_2$. The fourth potentiometer 14 may be connected to the second potentiometer. As well, the fourth potentiometer 14 may be attached to the back side of the base 4. In addition, the fourth potentiometer's axis $X_2$ may intersect with the perpendicular plane in which the four second potentiometer's axes $Z_1$ are located. As well, the fourth potentiometer 14 may be connected with microcontroller 6.

Figure 4:
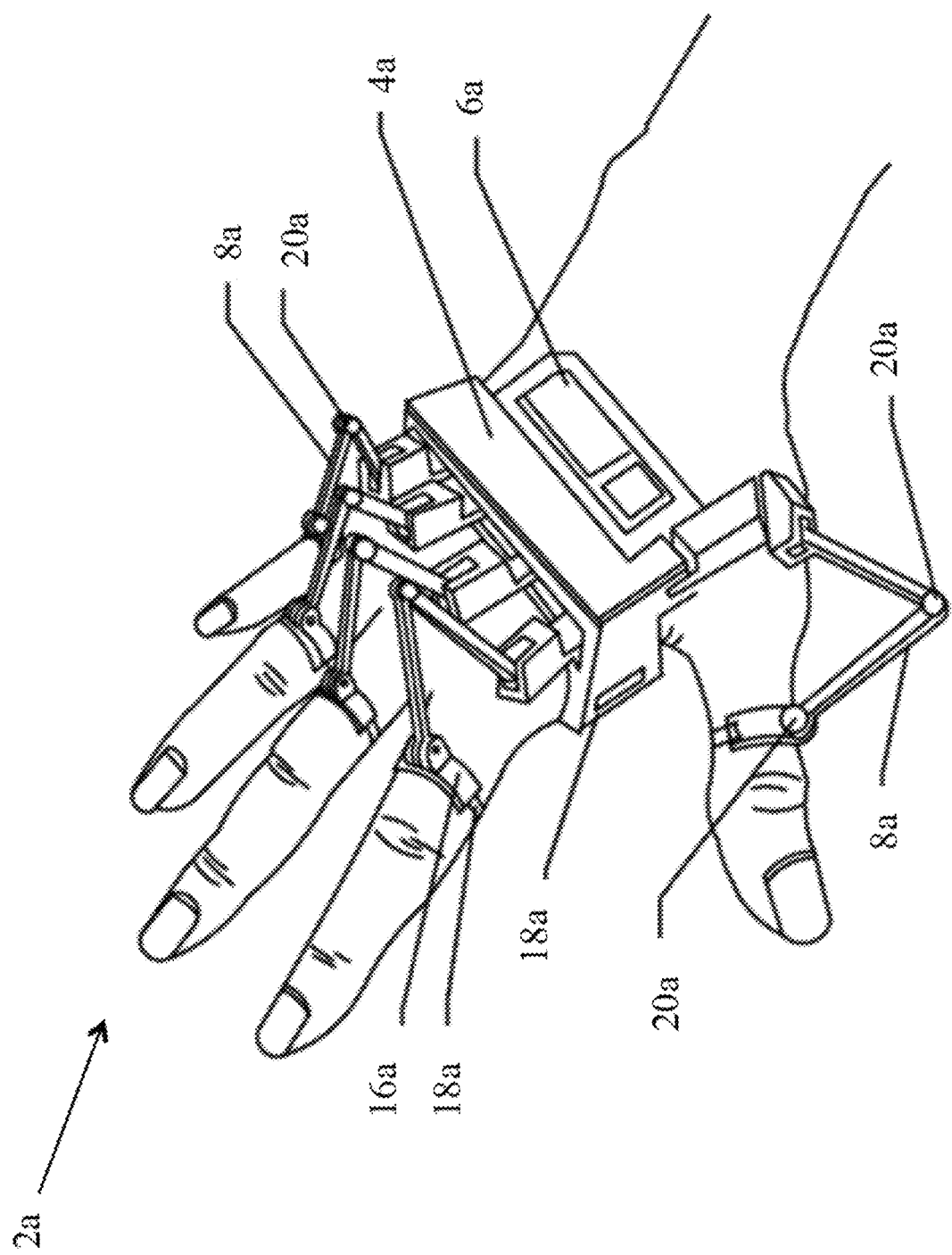
FIG. 4 illustrates a perspective view of another device, according to some embodiments.
Figure 5:
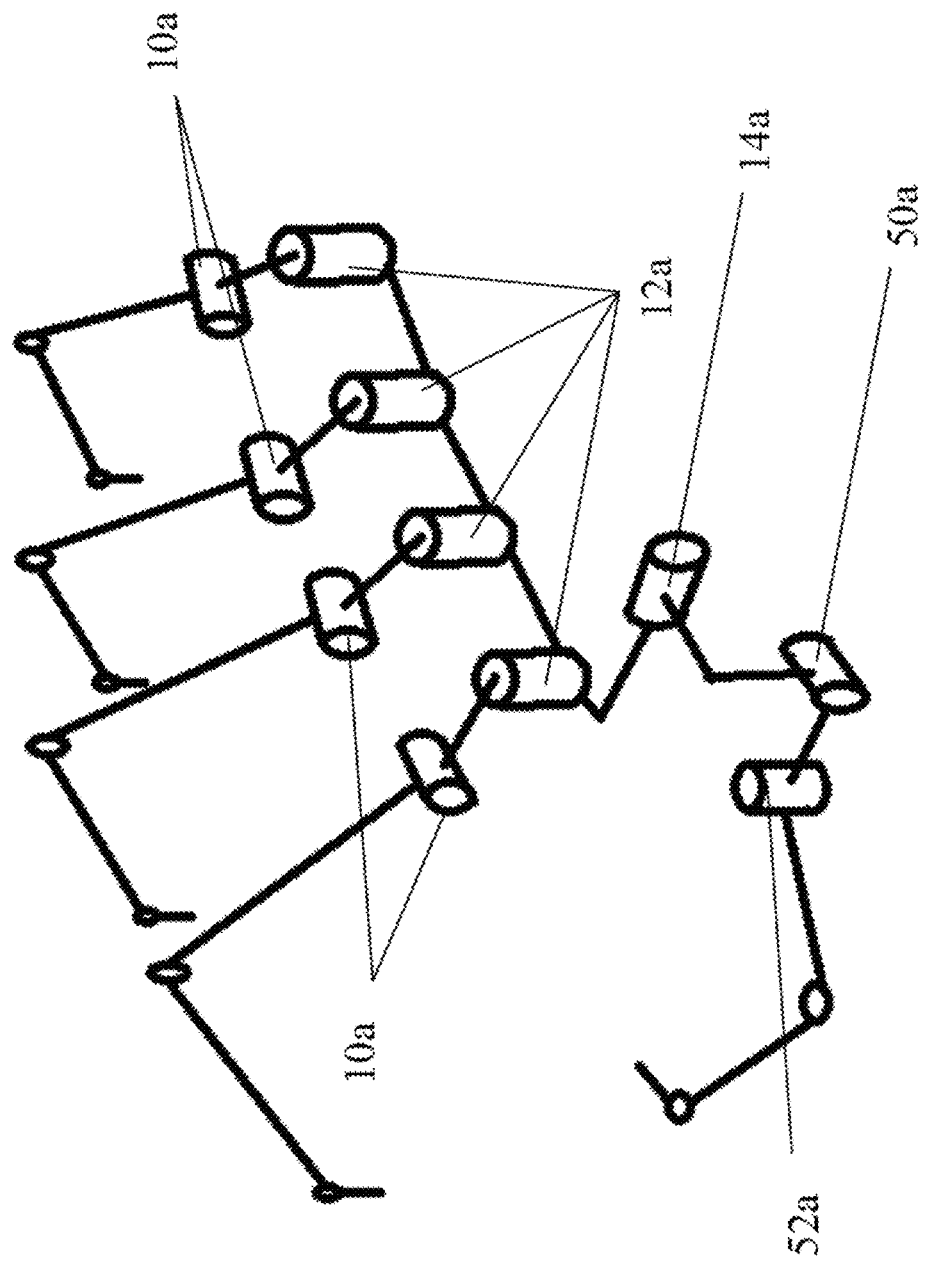
FIG. 5 illustrates a perspective view of a schematic of the device from FIG. 4, according to some embodiments.

FIGS. 4 and 5 illustrate another force feedback device 2a with a force feedback system. The device 2a illustrated in FIGS. 4 and 5 is similar to the device 2 disclosed in FIGS. 1-3; however, the device 2a disclosed in FIGS. 4 and 5 includes 11 potentiometers as opposed to the 16 potentiometers disclosed in device 2 of FIGS. 1-3. Accordingly, the device 2a shown in FIGS. 4 and 5 includes 11 degrees of freedom of movement, as opposed to the device 2 with 16 degrees of freedom of movement from FIGS. 1-3. In this manner, the device 2a of FIGS. 4 and 5 includes four-first potentiometers 10a, four-second potentiometers 12a, a fourth potentiometer 14a, a fifth potentiometer 50a, and a sixth potentiometer 52a.

Furthermore, the device 2a of FIGS. 4 and 5 is structurally similar to the device 2 of FIGS. 1-3, except that device 2a does not include four-third potentiometers 22 and a seventh potentiometer 54. In place of the third and seventh potentiometers 22 and 54, the device includes a hinged joint defined by connection bolts 20a that couple the adjacent profiled linked rods 8a together. Generally, it should be appreciated that the devices disclosed in FIGS. 1-5 are just two examples of the many different variations of devices that can include any number of potentiometers to thereby define any number of degrees of freedom of movement.

Figure 6:
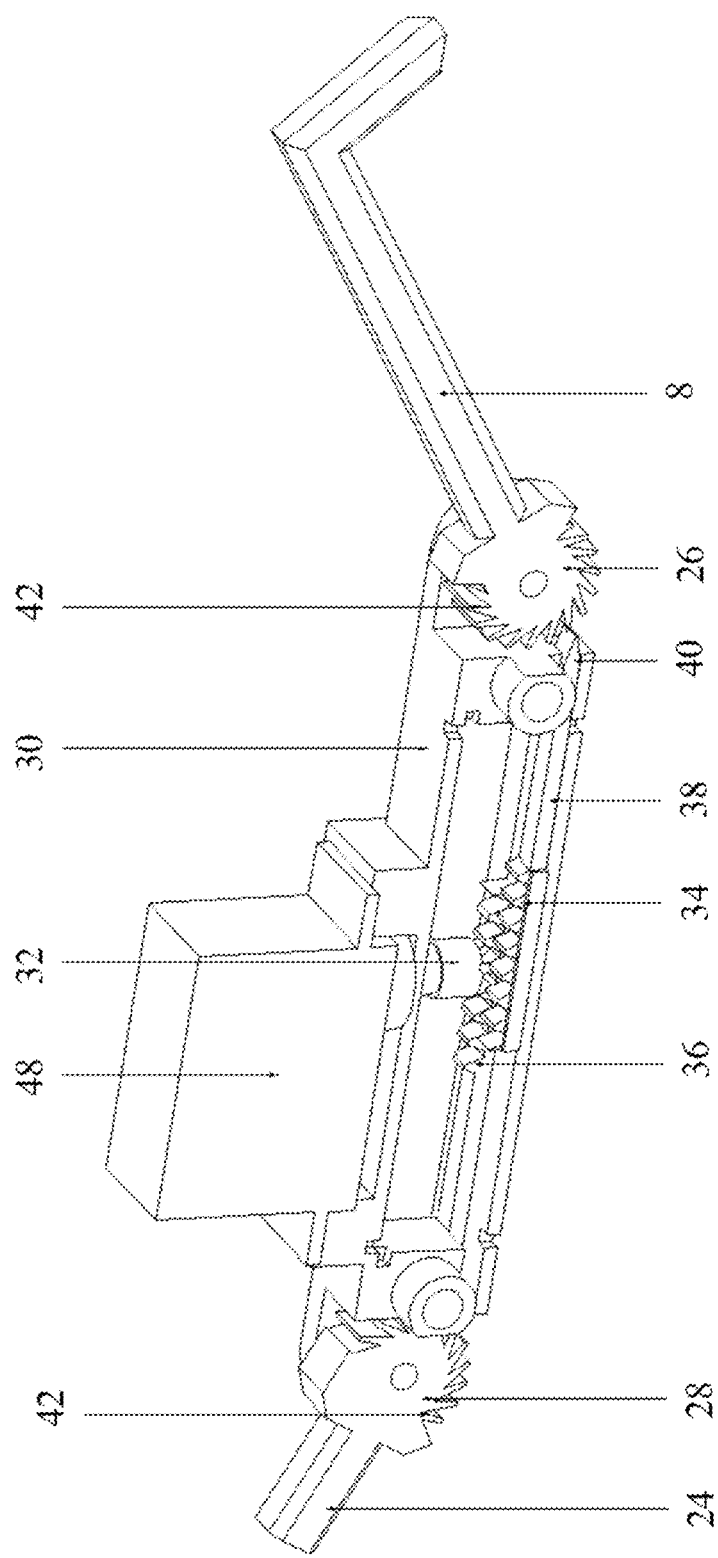
FIG. 6 illustrates a cross-sectional perspective view of a locking mechanism, according to some embodiments.
Figure 7:
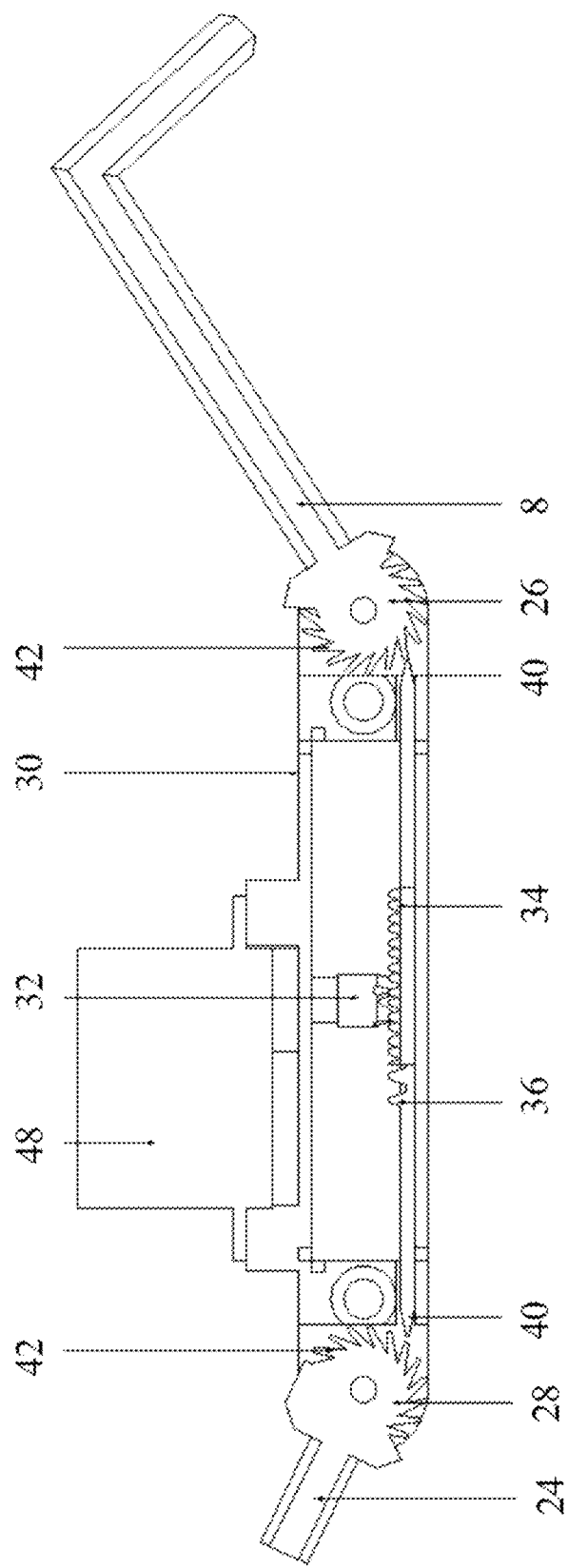
FIG. 7 illustrates a cross-sectional side view of the locking mechanism as shown in FIG. 6, according to some embodiments.
Figure 8:
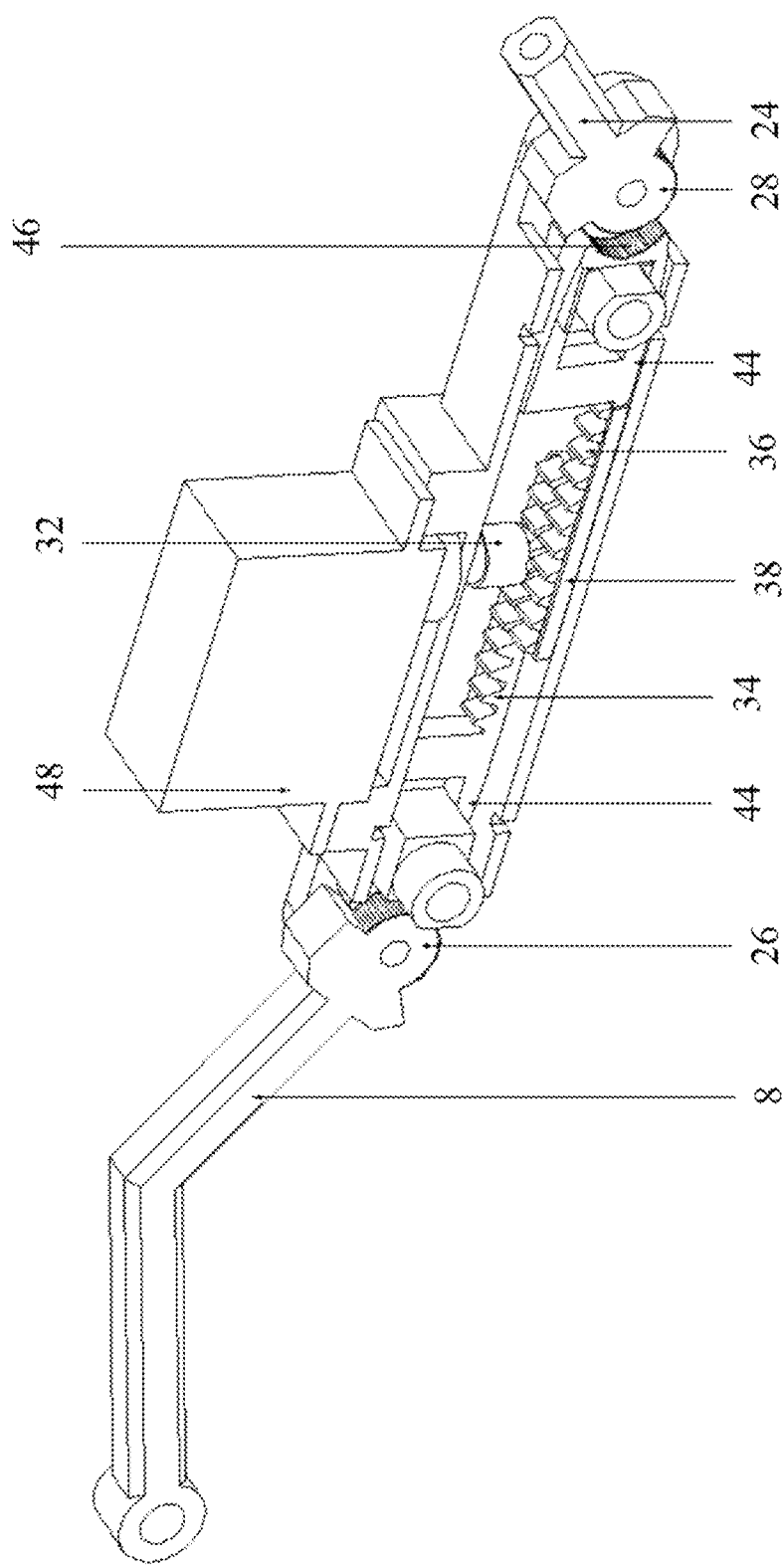
FIG. 8 illustrates a cross-sectional perspective view of another locking mechanism, according to some embodiments.
Figure 9:
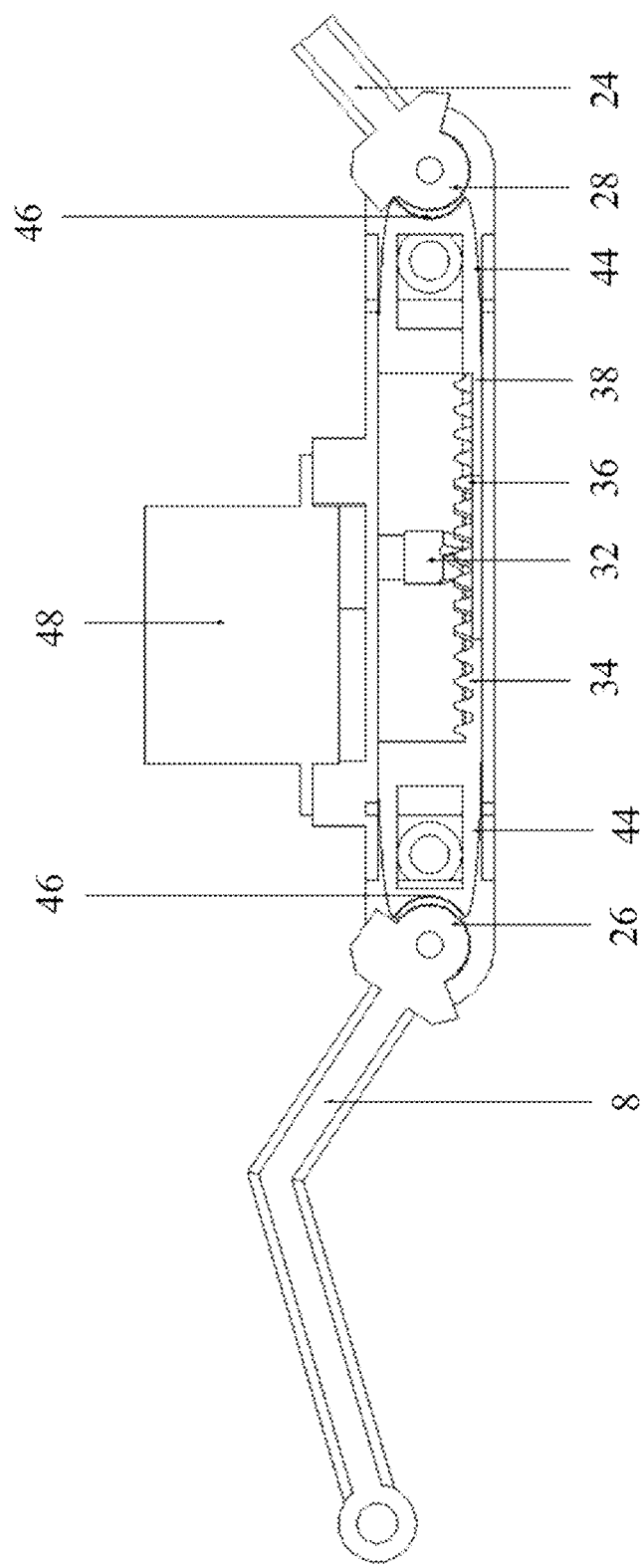
FIG. 9 illustrates a cross-sectional side view of the locking mechanism as shown in FIG. 8, according to some embodiments.

As shown in FIGS. 6 and 7, the link rods 18 may include five pairs of profiled link rods 8 and five straight rods 24. The four pairs of profiled link rods 8 and four straight rods 24 may be connected with the four-finger sensor module. The remaining pair that includes a profiled link rod 8 and one straight rod 24 may be connected with the thumb sensor module. Each pair of the profiled link rods 8 may be movably connected. As well, each pair may have a finger cap 16 on one side, and a first rotational joint 26 on the other side. One of the first rotational joints 26 may be coaxially connected with the seventh potentiometer 54. Furthermore, each of the other four first rotational joints 26 may be in coaxial connection with a third potentiometer 22.

Each straight rod 24 may have a second rotational joint 28 on one side. One of the second rotational joints 28 may be coaxially connected with the sixth potentiometer 52. The other four second rotational joints 28 may be coaxially connected with the first potentiometers 10. Furthermore, each of the straight rods 24 connected with the sixth potentiometers 52 may be connected with one of the fifth potentiometers 50 on the other end. The straight rod 24 connected with the first potentiometers 10 may also be connected with the second potentiometer on the other end.

The four-finger force feedback system and the thumb force feedback system may have the same structure. As such, each may include a case 30, a transmission mechanism and a locking mechanism. The transmission mechanism and the locking mechanisms may be disposed inside the case 30. The case 30 of each of the four-finger force feedback systems may have one of the third potentiometer 22 and one of the first potentiometer 10 on its two ends. The case 30 of the thumb force feedback system may have the seventh potentiometer 54 and the sixth potentiometer 52 on its two ends.

Each of the first rotational joints 26 of the profiled link rods 8 that are connected with the four-finger force feedback system may be in a coaxial connection with a respective third potentiometer 22. The first rotational joint 26 can be in a position-lock with the locking system. As well, each of the second rotational joints 28 of the straight rods 24 connected with the four-finger force feedback system may be in coaxial connection with the first potentiometer 10. The second rotational joint 28 may position-lock with the locking system. In some embodiments, the locking mechanism is a ratchet wheel self-lock mechanism. In some embodiments, the locking mechanism is a resistance wheel self-lock mechanism.

The first rotational joint 26 of the profiled link rod 8 connected with the thumb force feedback system may be coaxially connected with the seventh potentiometer 54. The first rotational joint 26 can position-lock via the locking system. The second rotational joint 28 of the straight rod 24 connected with the thumb force feedback system may be coaxially connected with the sixth potentiometer 52. The second rotational rod may position-lock via the locking system.

It should be appreciated that the potentiometers described in this disclosure can be any type of potentiometer. For example, the potentiometers can be rotational potentiometers or optical encoders, magnetic encoders, and the like. As illustrated in a simplified kinetic model, the structure of the thumb sensor module and four-finger sensor modules is shown in FIGS. 2 and 3, where each cylinder represents a rotational potentiometer. As shown in FIGS. 2 and 3, the 16 rotational potentiometers in the hand motion capture system can transform a rotational signal to an electrical signal. However, this is just one of many examples. It should be appreciated that other hand motion capture systems can have any number of rotational potentiometers greater than or less than 16 rotational potentiometers, for example 11, 21, or 26 potentiometers. Data can be collected from the rotational potentiometers by the microcontroller 6.

Because the thumb can have a different exoskeleton structure than the four-fingers (index, middle, ring and little), accordingly the thumb sensor module may consist of 4 potentiometers. Among them the fourth potentiometer 14, the fifth potentiometer 50 and the sixth potentiometer 52 can be perpendicular to each other, together forming the X, Y, and Z axes of a rectangular coordinate. It should be appreciated that the X, Y, and Z axes can be parallel to the first direction X, second direction Y, and third direction Z, respectively. Accordingly, the seventh potentiometer 54 and the sixth potentiometer 52 can be parallel and connected via the thumb force feedback system. The fourth potentiometer 14 can be attached to the back side of the base 4, and electrically connected to the microcontroller 6. The four-finger sensor modules may capture the motion of the other four fingers. The four-finger sensor modules and the thumb sensor module may be connected by the fourth potentiometer 14. Accordingly, all potentiometers may be connected to the microcontroller 6.

In the four-finger sensor module, the second potentiometer may be perpendicular to the first potentiometer 10. Accordingly, the first potentiometer 10 and the third potentiometer 22 may be parallel to each other and connected via the four-finger force feedback system. The four second potentiometers 12 may be attached to the base 4, and all aligned in the same direction. The four second potentiometers 12 may also be aligned in the same vertical plane perpendicular to the plane of the base 4, for example, the third direction Z. As well, the fourth potentiometer 14 may be attached to the backside of the base 4. Accordingly, the fourth potentiometers 14 can be lower than the other four second potentiometers 12, whereby its axis $Y_1$ intersects with the connection of the axes $Z_1$ of the four second potentiometers 12. Furthermore, the fourth potentiometer 14 may have an angle range from 0 to 30 degrees, which means the thumb base 4 has an angle range from 0 to 60 degrees relative to the four fingers, as illustrated in FIG. 3. The 0 to 60 degree deflection angle at the thumb base 4 joint may be ergonomically correct, which may allow the exoskeleton to match more closely with the thumb motions. This may allow the thumb to move more fluently to capture motions. As well, it may reduce any discomfort in wearing the device 2.

The 0 to 60 degrees may not mean that the device 2 can rotate in this range, but that a certain angle may be selected from this range and fixed.

As shown in FIGS. 6 and 7, the transmission system may also include a profiled gear 32, as well as a first rack 34 and a second rack 36. The first rack 34 can be parallel with the second rack 36. Each of the first and second racks 34 and 36 may be movably connected with one of two slide tracks 38 disposed inside the case 30. The profiled gear 32 may be connected to the case 30, above the first rack 34. In this configuration, the profiled gear 32 may mesh with the first rack 34 and the second rack 36. The first rack 34 and the second rack 36 may slide in the slide track 38 under the drive of the profiled gear 32.

In addition, FIGS. 6 and 7 demonstrate one way that locking may be achieved. As illustrated, the locking mechanism may be a ratchet wheel self-locking mechanism. A spark 40 may be included on one end of the first rack 34 such that it is near the first rotational joint 26, and on the end of the second rack 36 that is close to the second rotational joint 28. A plurality of ratchets 42 may surround the outer surfaces of the first rotational joint 26 and the second rotational joint 28. Accordingly, the ratchets 42 may mesh with the spark 40.

FIGS. 6 and 7 demonstrate yet another way that locking may be achieved. As shown, the locking system may include a resistance wheel. In this manner, a resistance or friction brick 44 may be connected with an end of the second rack 36 that is close to the second rotational joint 28, and an end of the first rack 34 that is close to the first rotational joint 26. In some embodiments, each friction brick 44 has a U-shape slot 46, which has an opening pointing towards the two sides of the case 30. The curved frictional concave of the U-shape slot 46 matches the first rotational joint 26 and the second rotational joint 28. As well, there may be matching threads on the curved frictional concave surface, as well as the first and second rotational joints 28. In addition to matching threads, other materials may be added to the concave surface to increase resistance. For example, these materials may be rubber, other types of polymers, or the like. In some examples, the materials may be aluminum and plastic.

The transmission system may have a drive system 48. The drive system 48 may be disposed outside the case 30 and connected with the profiled gear 32. The drive system 48 may also be connected with the microcontroller 6. In some embodiments, the drive system 48 is a servo motor, a gear motor linear actuator, or a screw motor. In some embodiments, the microcontroller 6 is a Bluetooth module. As well, in some embodiments, the connection pieces are disposed on an outer surface of the base 4. The connection pieces may be nylon straps, metal rings, plastic rings, or the like. As well, the finger caps 16 may form movable connections with the profiled link rods 8 by connection bolts 20. In practice, a host computer decides whether the hand touches virtual objects. If it touches, the host computer sends a signal to the microcontroller 6, which drives the motor to lock the joints and obstructs the hand to crawl and bend, thus generating a sense of gripping for the user.

Figure 10:
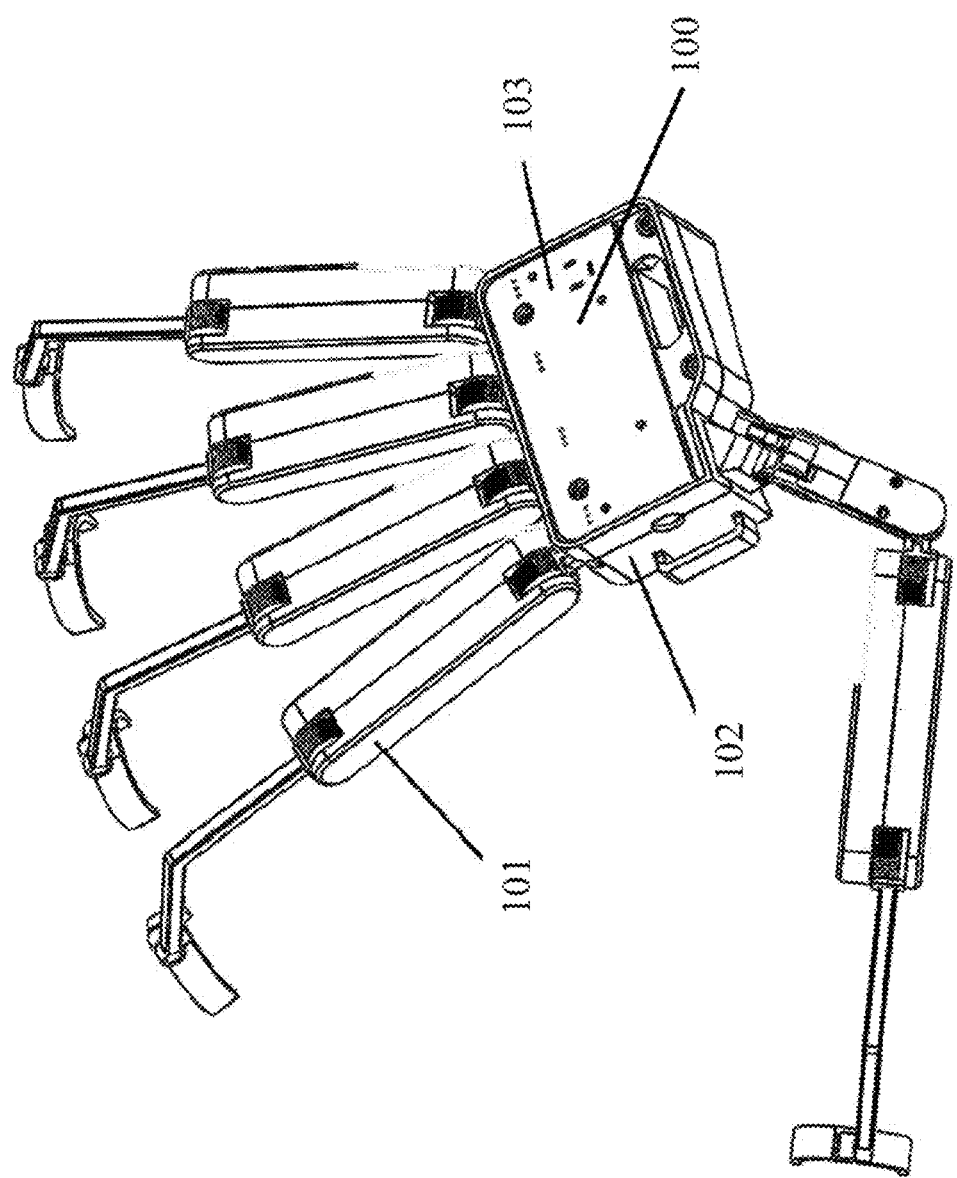
FIG. 10 illustrates a perspective view of a device using force-feedback, according to some embodiments.

With specific reference to FIG. 10, some embodiments of the device 101 may be installed on a hand-motion-capturing exoskeleton, thus enabling its force feedback abilities. The force feedback unit is mechanically connected to the base of the hand-motion-capturing exoskeleton 102 and electronically connected to the main microcontroller 103. In some embodiments, for each hand exoskeleton, five force feedback units are used to correspond to each of the five fingers of the hand. In some embodiments, for each hand exoskeleton, one force feedback unit is used to correspond to each of the five fingers of the hand.

Figure 11:
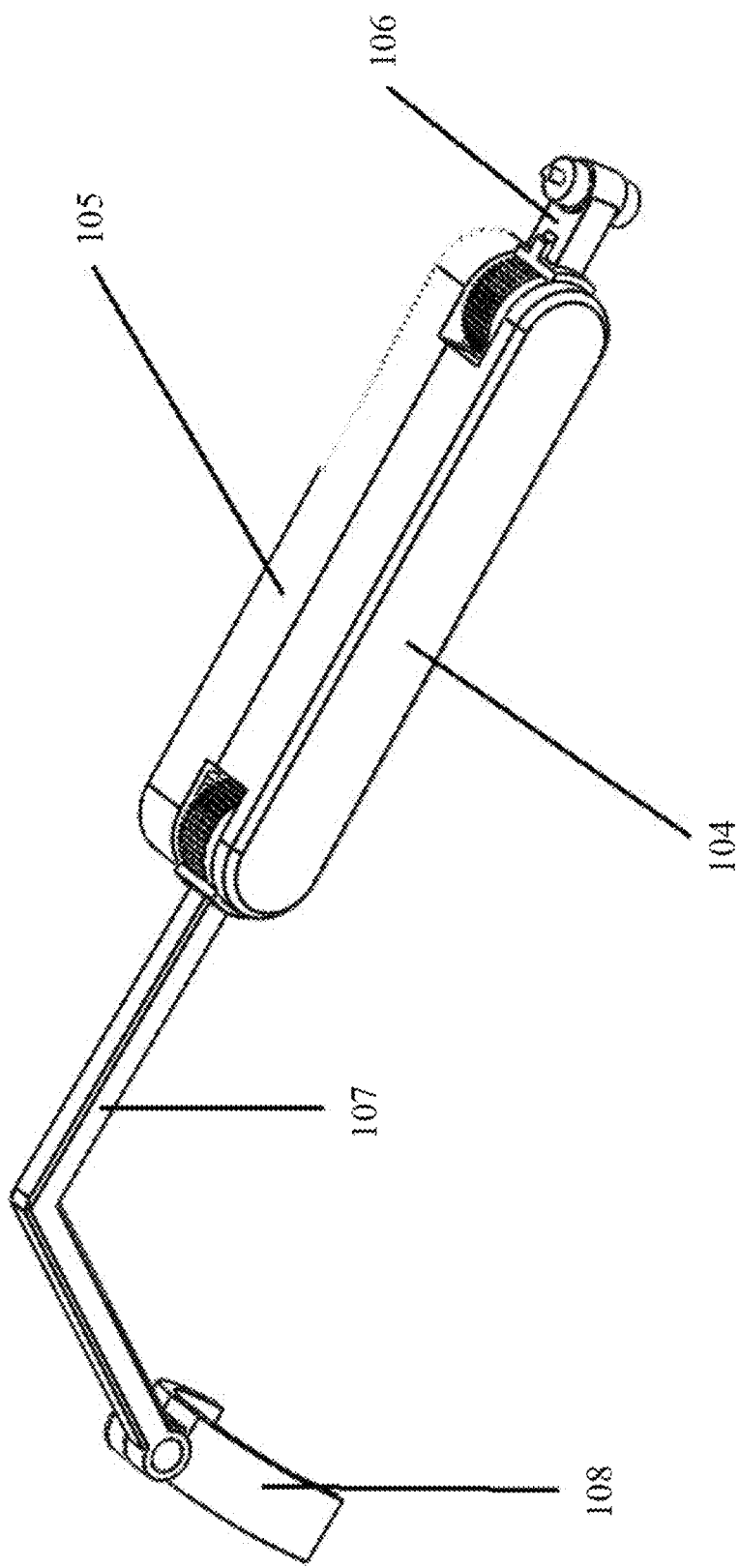
FIG. 11 illustrates a perspective view of a schematic of the force-feedback implementation of FIG. 10, according to some embodiments.
Figure 12:
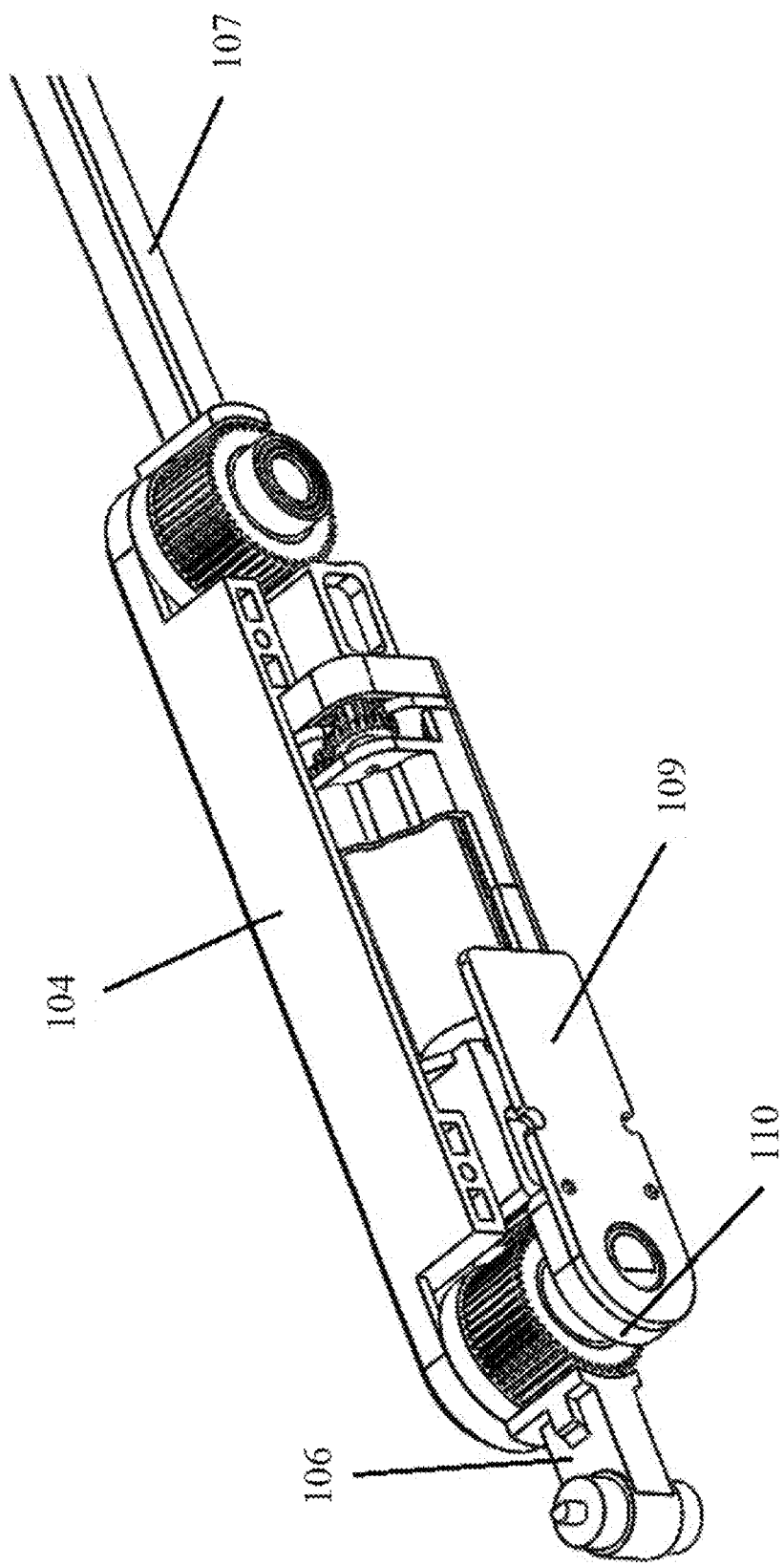
FIG. 12 illustrates a more detailed perspective view of a schematic of the force-feedback implementation from FIG. 11, according to some embodiments.

As shown in FIGS. 11 and 12, the force feedback unit is enclosed by the left half shell 105 and right half shell 104, and is mechanically linked to the base of the exoskeleton 102 via an upper link bar 106. On the other end the force feedback unit (the device) 101 is mechanically connected to the finger cap 108 via a profiled lower link bar 107. The finger cap 108 is connected directly to the users' fingertip, it thus transmits the force onto each fingertip. The device 101 includes a microcontroller 109, as well as a rotation sensor 110. When the force feedback module is not activated, the rotation sensor 110 reads the angle change and send it back to the main microcontroller 103 via the microcontroller 109. It should be appreciated that the rotation sensor can be, among other things a magnetic encoder, an optical encoder or simply a potentiometer. The data can be bidirectionally transmitted between the main microcontroller 103 and the on board micro controller 109 via a wire. The force feedback device may be configured to capture hand motion. The exoskeleton nay be a motion capturing device. The exoskeleton may be configured to interface with a motion capturing device, for example the exoskeleton may be configured to interface with a flex sensor based motion capturing device, a IMU based motion capturing device, etc.

Figure 13:
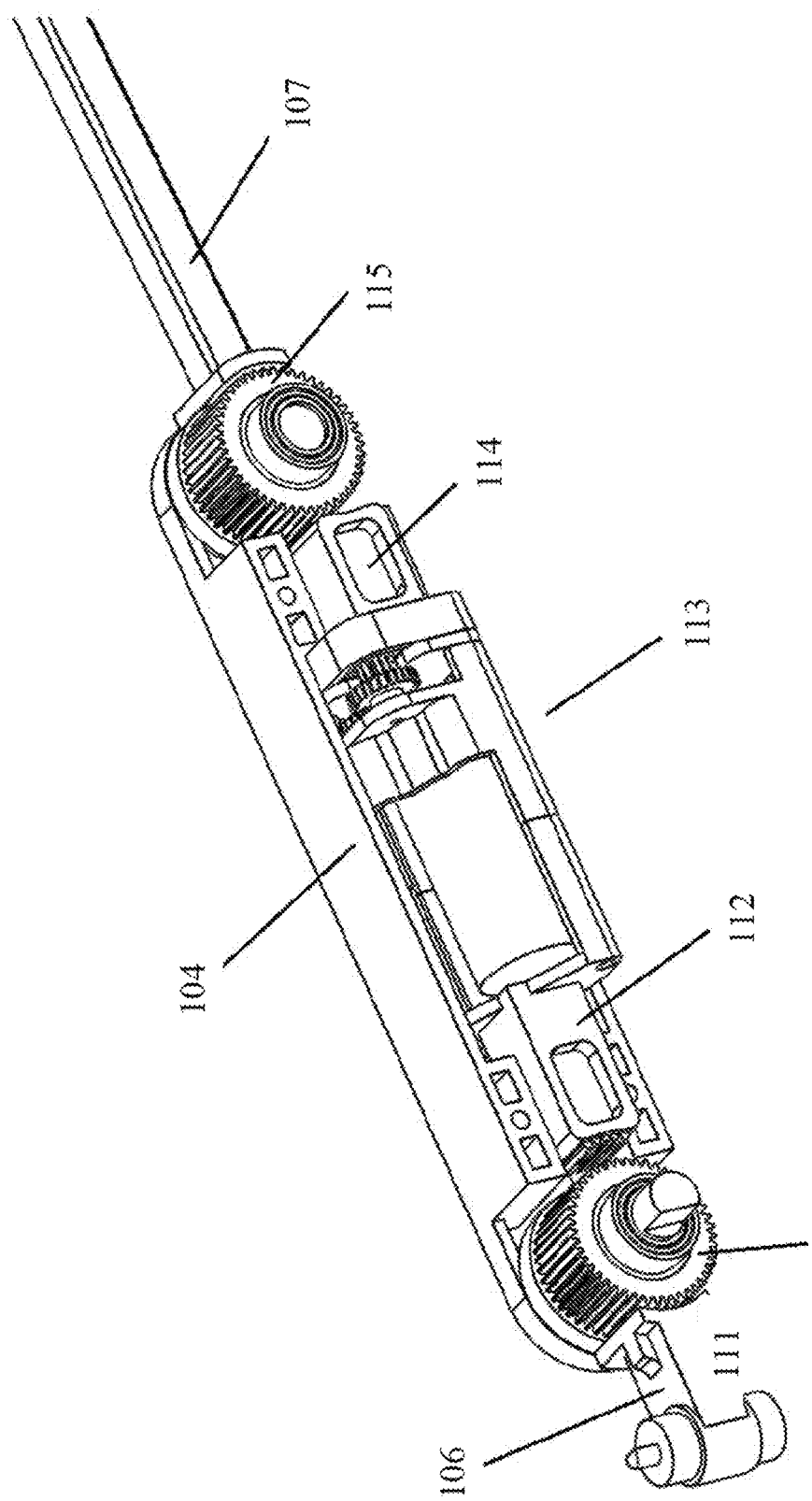
FIG. 13 illustrates a perspective view of a schematic of the transmission system from FIG. 12, according to some embodiments.
Figure 14:
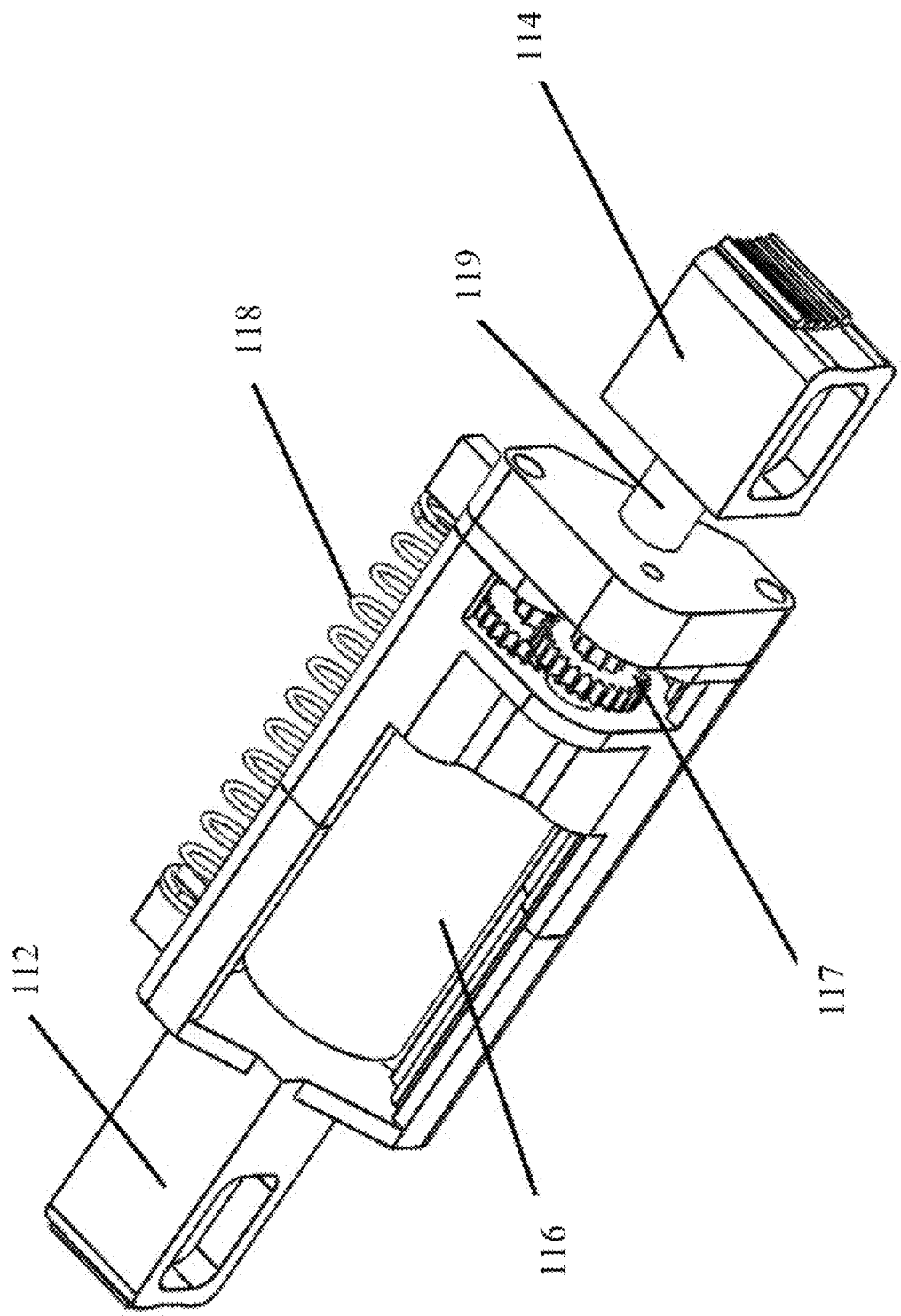
FIG. 14 illustrates a perspective view of a device using a force-feedback unit, according to some embodiments.
Figure 15:
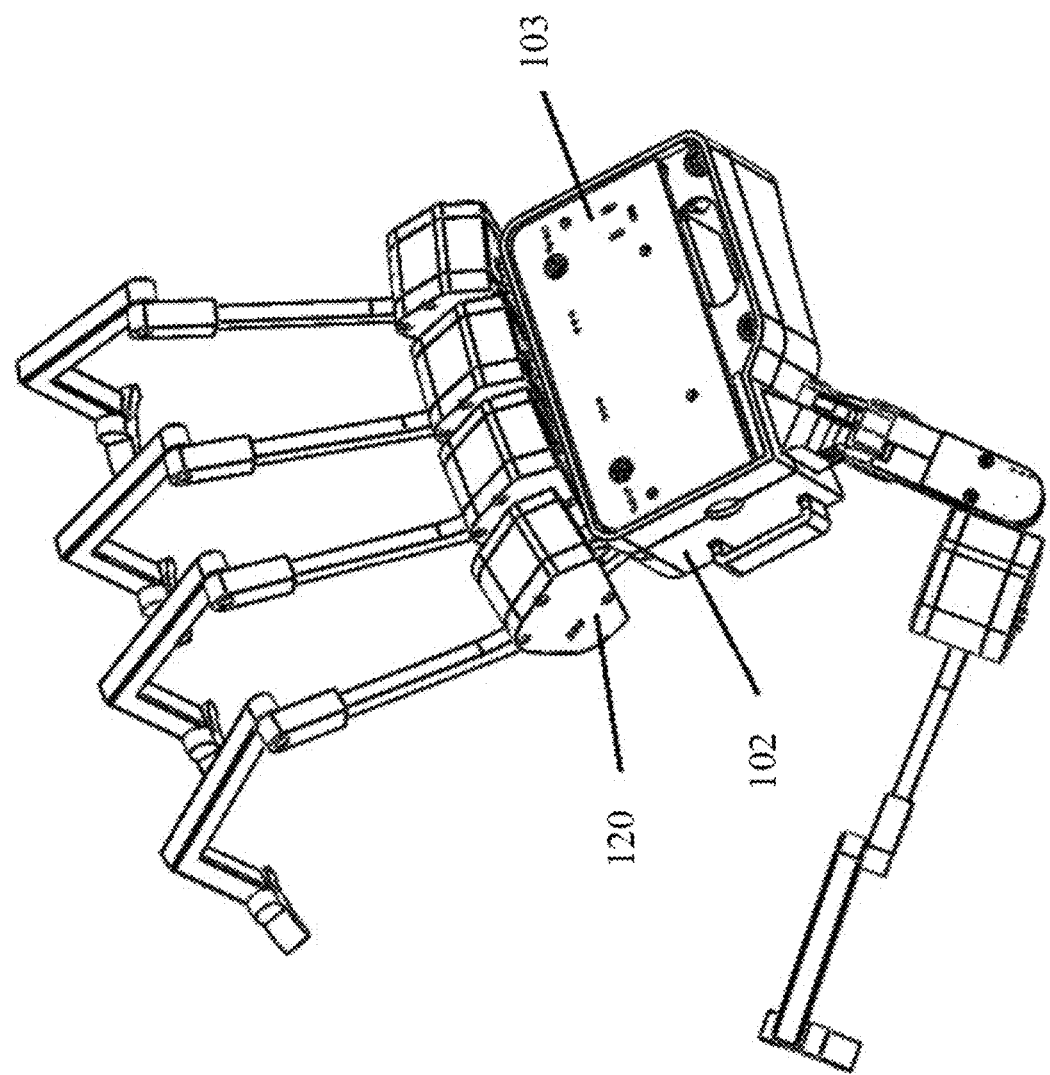
FIG. 15 illustrates a perspective view of a schematic of a force-feedback unit, according to some embodiments.

FIGS. 12, 13 and 14 demonstrate one way that force feedback could be achieved: via a side-locking mechanism. A profiled gear ring 111 is mechanically connected to the upper link bar 106. On the other end of the device, another profiled gear ring 115 is mechanically connected to the lower link bar 107. Gear ring 111 and gear ring 115 may be identical or may be unique. In the center of the device there is a linear actuator slider module 113. On the end closer to the upper ring gear 111, a profiled anti-shaped-gear 112 is fixed at the end of the linear actuator slider module 113. On the other end closer to the lower ring gear 115, a profiled anti-shaped-gear slider 114 may be movably connected with the linear actuator slider module 113 via a worm gear 119. The linear actuator slider module 113 itself is made up of a motor 116 and a transmission gear box 117. The gear ratio and gear configuration of the transmission gear box may be arbitrary. It should be appreciated that the linear actuator slider can be any kind of linear actuator, i.e. a linear solenoid, or a rotational solenoid with a worm gear, which transform its rotational movement into linear movement.

When the device is activated and the force feedback mode is on, the motor 116 will start to run and via the transmission gear box 117, rotate the worm gear 119, and push the movable profiled anti-shaped-gear slider 114 along the direction of the linear actuator slider module 113. Once the profiled anti-shaped-gear slider 114 meshes with the lower ring gear 115, the rotation of the lower link bar 107 will be locked in place. The linear actuator slider module 113 will then slide backward along the same path because the linear actuator is still elongating. Next the profiled anti-shaped-gear fixed at the end will mesh with the upper ring gear 111. The microcontroller 109 reads the increase in motor current because of the stalling and then commands the motor 116 to stop running. At this point the force feedback unit fully locks both its joints, thus providing a rigid force feedback to the end finger cap 108. The unlocking process is just reversing the motor, and once the linear actuator slider module 113 shortens back to its original length, the spring 118 between the linear actuator slider module 113 and the left shell 104 will bring the linear actuator slider module 113 back to its original position thus restore free rotation mode for the end ring gears 111 and 115. It should be appreciated that for the gear box mentioned can be any back drivable combination of gears. For example, it can be a combination of two bevel gears when the motor is installed on the same plan with the torque output arm, or ball screws and flat gears. It should also be appreciated that the linear actuator can be any kind of linear actuator, i.e. a linear solenoid, or a rotational solenoid with a worm gear, which transform its rotational movement into linear movement.

FIGS. 15, 16, 17, 18, 19 demonstrate another way force feedback can be achieved: via a direct drive motor system. With specific reference to FIG. 15, some embodiments of the device 120 may be installed on a hand-motion-capturing exoskeleton, thus enabling its force feedback abilities. The force feedback unit 101 is mechanically connected to the base of the hand-motion-capturing exoskeleton 102 and electronically connected to the main microcontroller 103. In some embodiments, for each hand exoskeleton, five force feedback units may be used to correspond to the five fingers of the hand.

Figure 16:
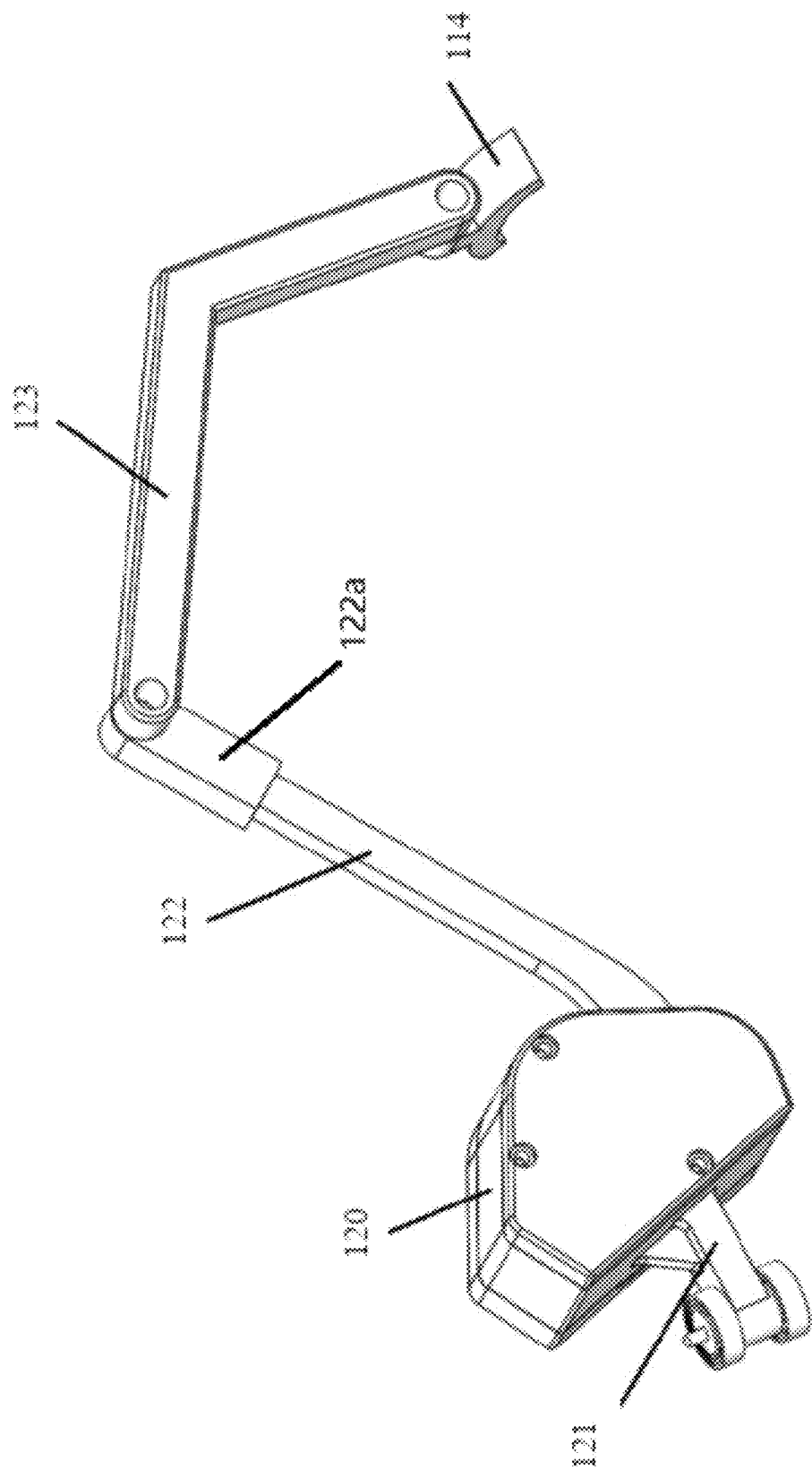
FIG. 16 illustrates another perspective view of a schematic of the transmission system from FIG. 15, according to some embodiments.

FIG. 16 demonstrates how the device 120 can be installed to a hand-motion-capturing device. The upper link bar 121 helps to mechanically connect the device 120 to the base 100 of the exoskeleton. The torque output arm 122 of the device 120 is jointed to a cap 122a, which is movably jointed to the profiled lower link bar 123. The profiled lower link bar 123 is then movably coupled to the finger cap 108 to transmit the torque output to the users' fingertips. It should be appreciated that the cap 122a and profiled lower link bar 123 may define different lengths and different shapes to fit with different finger lengths and user hand sizes.

Figure 17:
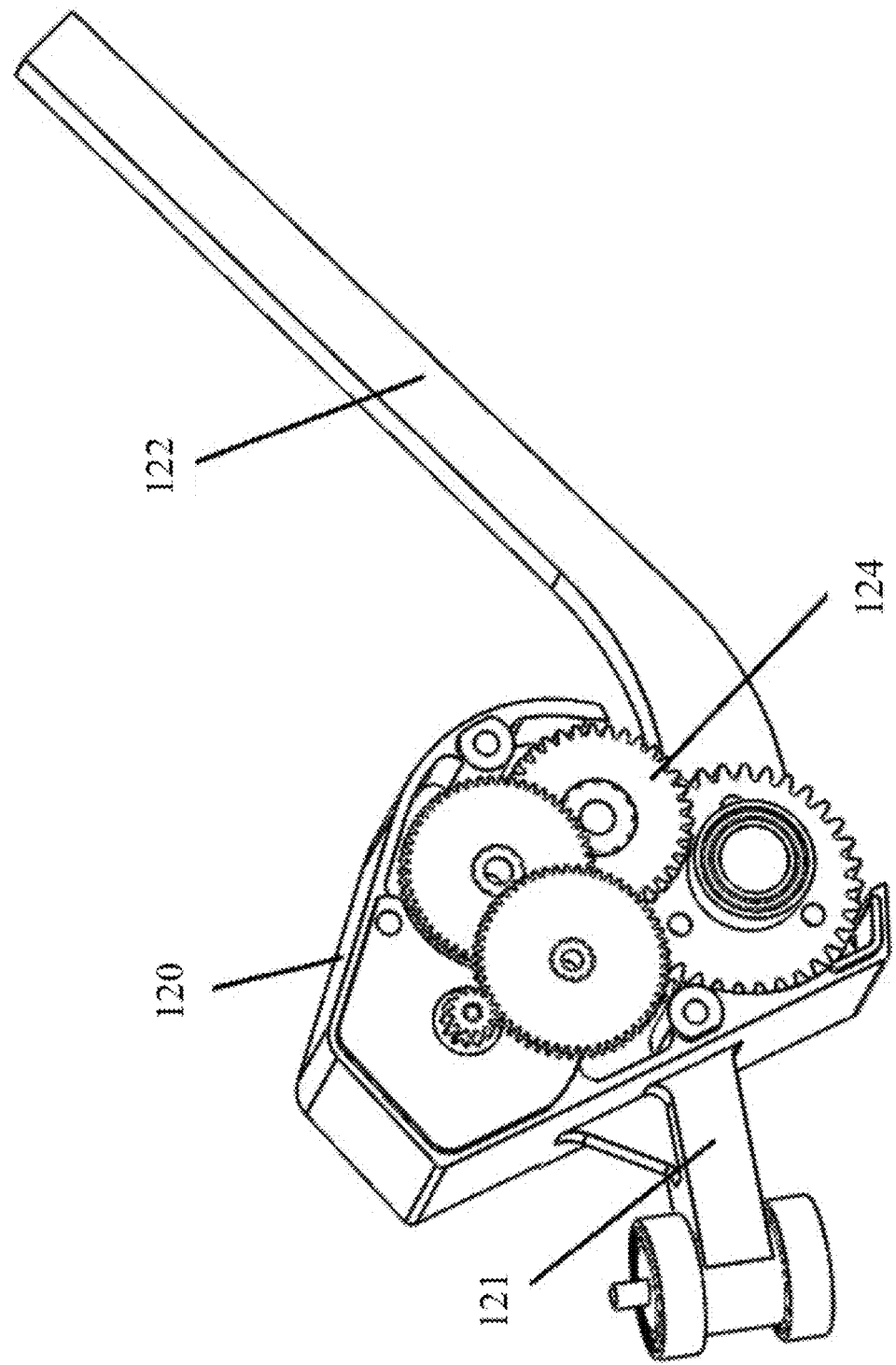
FIG. 17 illustrates another perspective view of a schematic of the electronic system from FIG. 16, according to some embodiments.
Figure 18:
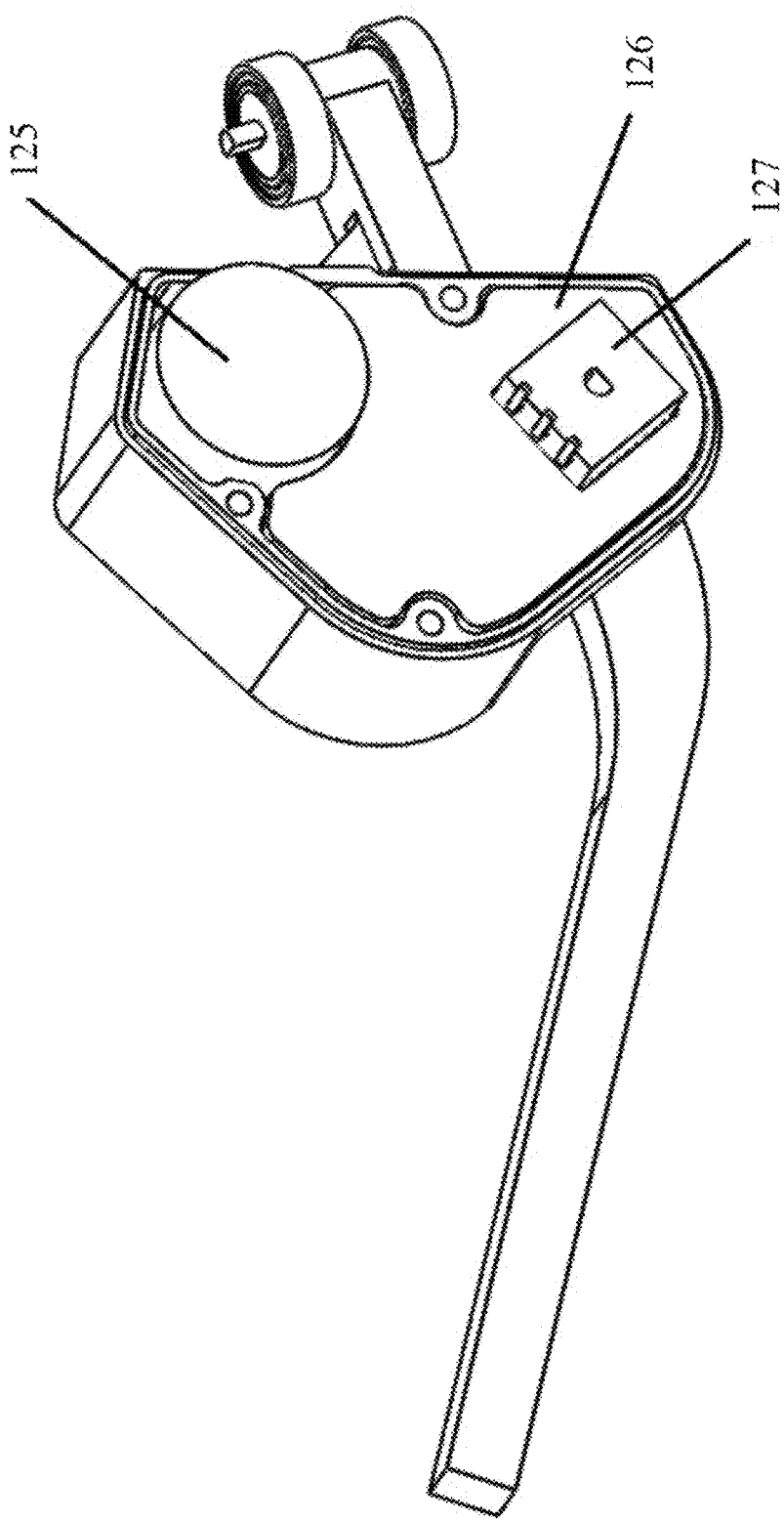
FIG. 18 illustrates another perspective view of a schematic of the electronic system from FIG. 17, according to some embodiments.

As shown in FIGS. 17 and 18, the device is consists of a motor 125, a transmission gear box 124, a torque output arm 122, a microcontroller 126 on it, and a rotation sensor 127. The microcontroller controls the motor rotation as well as the overall torque output, in other words the "stiffness output". When the force feedback module is not activated, the rotation sensor reads the angle change and send it back to the main microcontroller 103. When the force feedback module is activated, the on board microcontroller 126 will start to compute and regulate the torque output. It should be appreciated that the motor and transmission can be any type of motor system. The transmission may be not just include a level gear transmission. Depending on the position and orientation of the motor, bevel gears, the transmission may implement back-drivable worm gears to help to transmit the torque to the torque output arm. The motor may also be a solenoid, or other actuators that can output torque.

Figure 19:
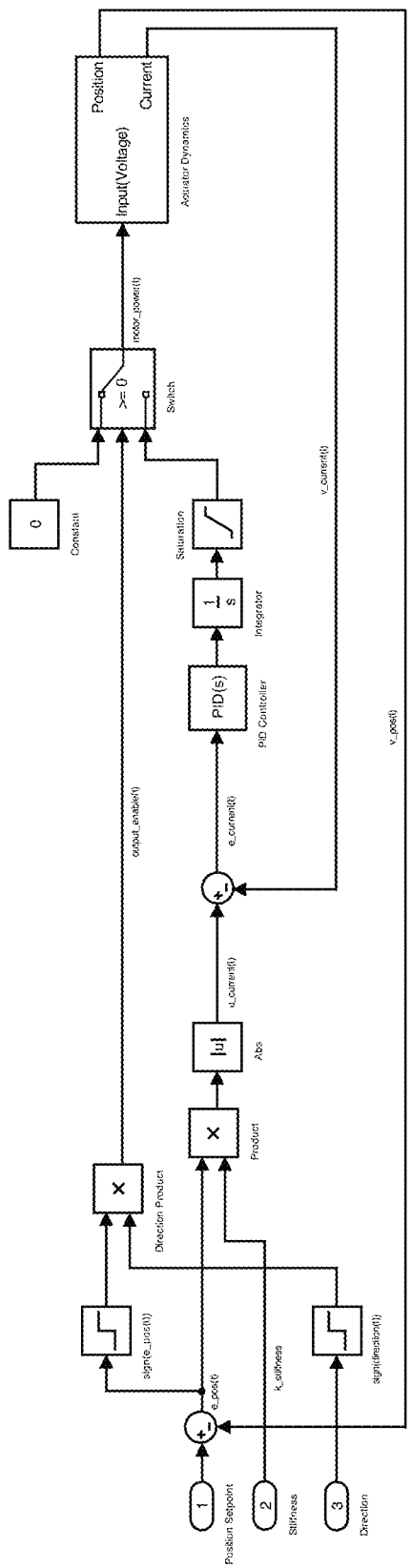
FIG. 19 is a schematic of a control process, according to some embodiments.

FIG. 19 shows the control process in detail. This device implements a motor control technique is called the "impedance control", turning a regular servo motor into an electronic spring, which stiffness can be electronically regulated. Some force feedback unit implementations may also provide computer-controlled resistance, to create different levels of springiness, which may effectively simulate the user feeling the object not existing in his or her presence. It achieves this by monitoring the current position of the torque output arm 122 as well as the current going through the motor 125. Based on the displacement of the torque output arm 122 comparing to the set point in the virtual world, an expected torque output can be calculated, and it may be multiplied by a stiffness constant to change the overall output. Because torque is proportional to current, and expected current can be calculated, in this way the microcontroller 126 performs a close loop control on the motor so the force feedback can be generated.

Figure 20:
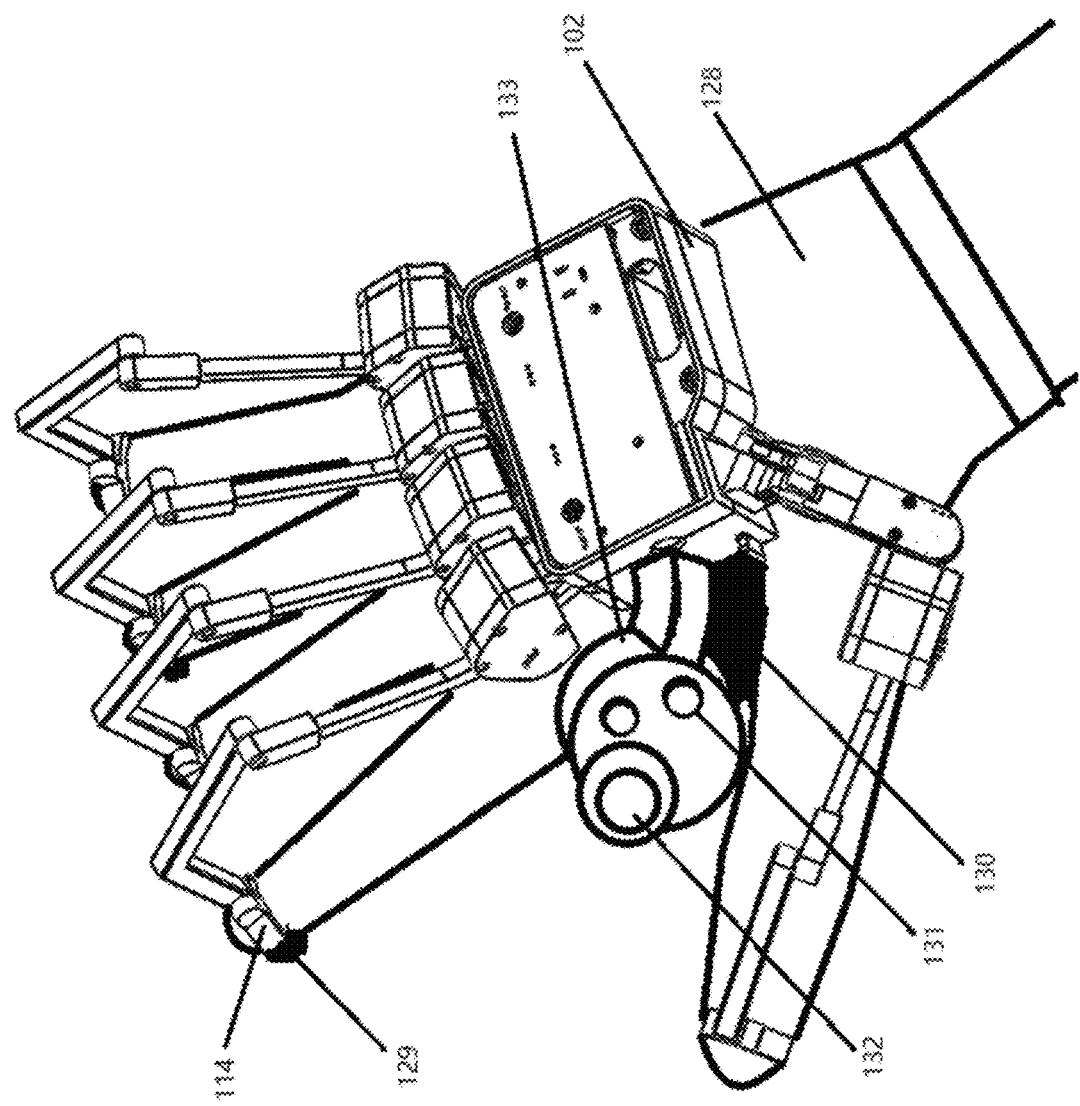
FIG. 20 illustrates a device equipped with the force feedback unit worn on a hand.

FIG. 20 shows how the motion capturing device equipped with the force feedback unit can be worn. The finger cap 114 is connected to the fingertip with a strip 129. The base 102 is fixed to the hand or to a glove with a palm strip 130. The device may be worn directly or may be worn on a glove 128, worn by the user. It should be appreciated that the finger cap 114 and base 102 can be fixed to the glove by means other than the strip, i.e. they can also be stitched directly to the glove. One or more buttons, dials or other user controls 131 and joystick 132 may or may not be attached to the base 102. FIG. 20 is for illustration purpose only. The positions of these attachments can be arbitrary. For example the illustration presents one or more buttons 131 and joystick 132 on an external piece 133 that is attached to the base 102. However these buttons 131 and joystick 132 can also be added to any location on the exoskeleton. It is appreciated that the joystick may provide input for orthogonal position input or angular rotational input.

Figure 21:
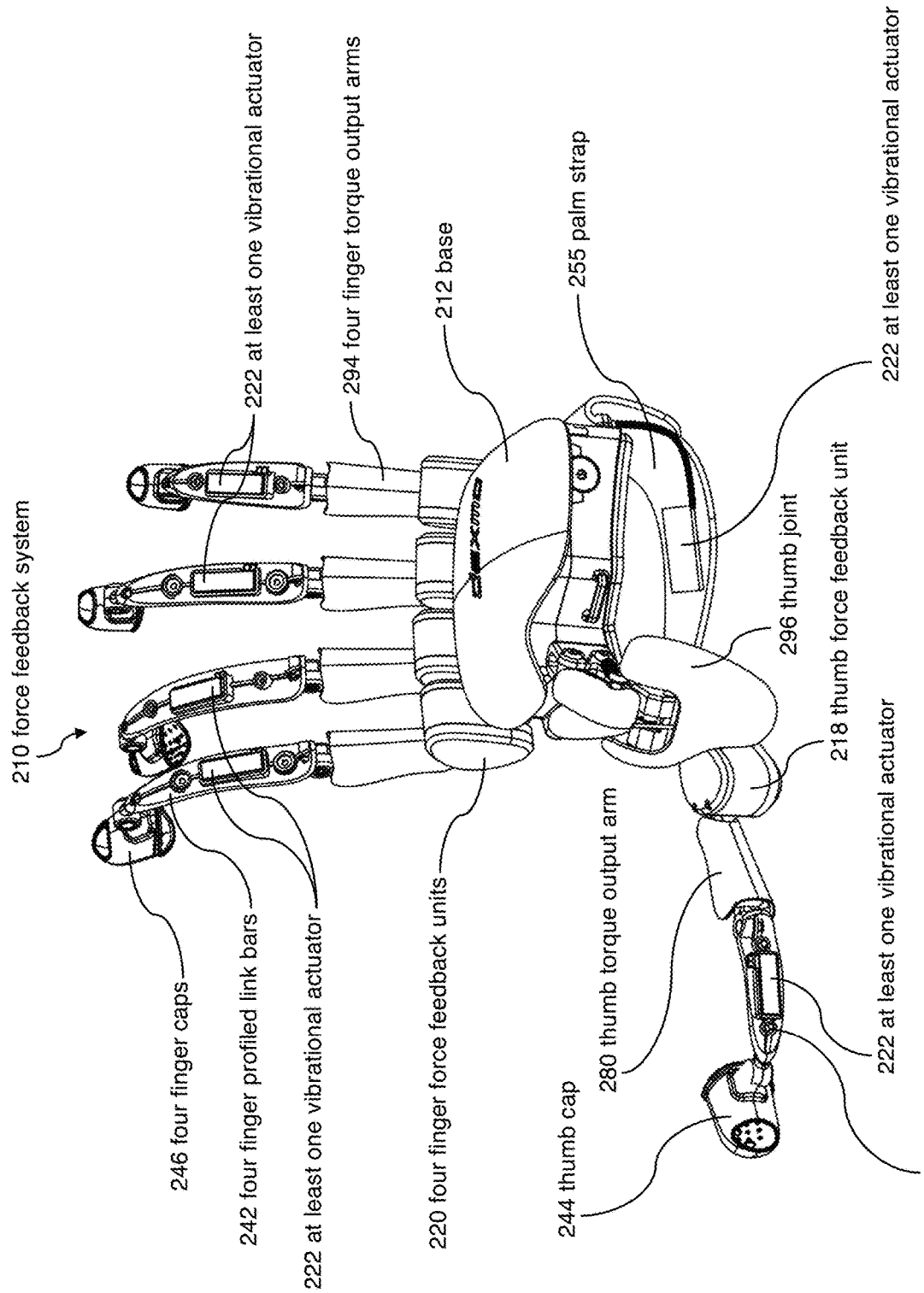
FIG. 21 illustrates a perspective view of a force feedback system, according to some embodiments.

FIG. 21 shows an embodiment of a force feedback system 210 whereby various components of the system are detachable. The detachable nature of the system 210 may allow a user to remove and attach components more suitably sized for the specific user. In the embodiment depicted in FIG. 21, the system 210 includes a base 212, a thumb force feedback unit 218, four finger force feedback units 220, and a palm strap 255. In some embodiments, the system 210 may be coupled to a glove 128 whereby the glove 128 is coupled to the user's hand. In many embodiments, the palm strap 255 is a type of device configured to attach to the user's hand. The palm strap 255 may be described as a hand wearable mechanism.

The embodiment shown in FIG. 21 may also include at least one vibrational actuator 222, which comprise any type of vibrational actuator, vibrational motor, rotating mass motor, or linear resonant actuator. As shown in FIG. 21, one vibrational actuator 222 is shown on each finger portion, the thumb portion, and on the palm strap 255. With the exception of the at least one vibrational actuator 222 coupled to the palm strap 255, the at least one vibrational actuator 222 may be substantially permanently coupled to the system 210.

It should be noted that the at least one vibrational actuator 222 may be coupled to other components on the system 210 than what is shown in FIG. 21. For example, the at least one vibrational actuator 222 may be coupled to and/or within the base 212 rather than the palm strap 255, and may be coupled to the thumb torque output arm 280 or four finger torque output arms 294 rather than the thumb profiled link bar 240 and four finger profiled link bars 242. In some embodiments, the at least one vibrational actuator 222 is integrated into the thumb cap 244 and the four finger caps 246. In some embodiments, the at least one vibrational actuator 222 is coupled to the thumb force feedback unit 218 and the four finger force feedback units 220. FIG. 21 also includes other components of the system 210, including a thumb joint 296, a thumb cap 244, and four finger caps 246. The thumb cap 244 and four finger caps 246 will be discussed in greater detail with reference to FIGS. 25A-26B.

In many embodiments, the system 210 is a combination of force feedback and haptic feedback. The addition of haptic feedback, through the use of the at least one vibrational actuator 222, may enhance the user experience by providing more realistic physical stimuli. In many embodiments, the physical stimulus experienced by a user comprises vibration of varying effects to stimulate different experiences. For example, when the user "touches" a rough surface in virtual reality (VR), the system 210 may provide a strong vibration. In contrast, when the user "touches" a soft or smooth surface in VR, the system 210 may provide minimal vibration. The vibration experienced by the user may vary in at least one of amplitude, duration, waveform type, and frequency.

Vibration may be provided to the user through the at least one vibrational actuator 222, which may be located in several different areas of the system 210, as discussed above. In some embodiments, the at least one vibrational actuator 222 includes a vibrational motor communicatively coupled to a driving chip. In some embodiments, the driving chip is coupled to the base 212 or to the thumb force feedback unit 218 or the four finger force feedback units 220. In some embodiments, the driving chip is configured to collect vibration orders, based on digital signals, from the microcontroller 214 (via the communicatively coupled remote computing device) and translate the orders into the appropriate amplitude, frequency, duration, etc. of the vibration. The translated orders may then be transmitted to the at least one vibrational actuator 222, which causes the vibration feedback felt by the user. Furthermore, in some embodiments, the translated orders given from the driving chip(s) to the vibrational actuator are AC voltage.

In some embodiments, the vibration feedback is felt in at least one of a finger tip 250, thumb tip 252, palm, and backside 256 of the user's hand. Some embodiments of the system 210 may be configured to provide vibration feedback in only one or a combination of areas; for example, one embodiment may only provide feedback in the thumb tip 252 and finger tips 250, while some embodiments may provide feedback to the palm and backside 256 of the user's hand. In some embodiments, the system 210 provides feedback to all of the areas or any combination thereof. In order to provide vibration feedback to the user's finger and thumb tips 250, 252, the vibration order may be conducted from the at least one vibrational actuator 222 located in the thumb and four finger profiled link bars 240, 242 to the thumb and four finger caps 244, 246.

In many embodiments, as briefly mentioned above, the system 210 includes a thumb force feedback unit 218 and four finger force feedback units 220. The thumb force feedback unit 218 may comprise a thumb housing, a thumb rotational sensor, a thumb microcontroller, a thumb transmission gear box, a thumb motor, and a thumb vibrational actuator. In some embodiments, the thumb force feedback unit 218 is coupled to the thumb joint 296 and the thumb torque output arm 280, which in turn is coupled to the thumb profiled link bar 240, which is further detachably coupled to the thumb cap 244. The thumb force feedback unit 218 may be configured to communicate with the main microcontroller 214 such that the microcontroller 214 and driving chip pass information and/or signals (e.g., vibration orders) to and/or from the thumb force feedback unit 218. Various components of the thumb force feedback unit 218, including the thumb transmission gear box and thumb motor, may facilitate movement of the thumb portion of the system 210.

The four finger force feedback units 220 may comprise four finger housings, four finger rotational sensors, four finger microcontrollers, four finger transmission gear boxes, four finger motors, and four finger vibrational actuators. The four finger force feedback units 220 may be coupled to the base 212, the four finger torque output arms 294, which in turn are coupled to the four finger profiled link bars 242, which are further detachably coupled to the four finger caps 246. The four finger force feedback units 220 may be configured to communicate with the main microcontroller 214 such that the microcontroller 214 and driving chip pass information and/or signals (e.g., vibration orders) to and/or from the four finger force feedback units 220. Various components of the four finger force feedback units 220, including the four finger transmission gear boxes and four finger motors, may facilitate movement of the finger portions of the system 210.

Figure 22A:
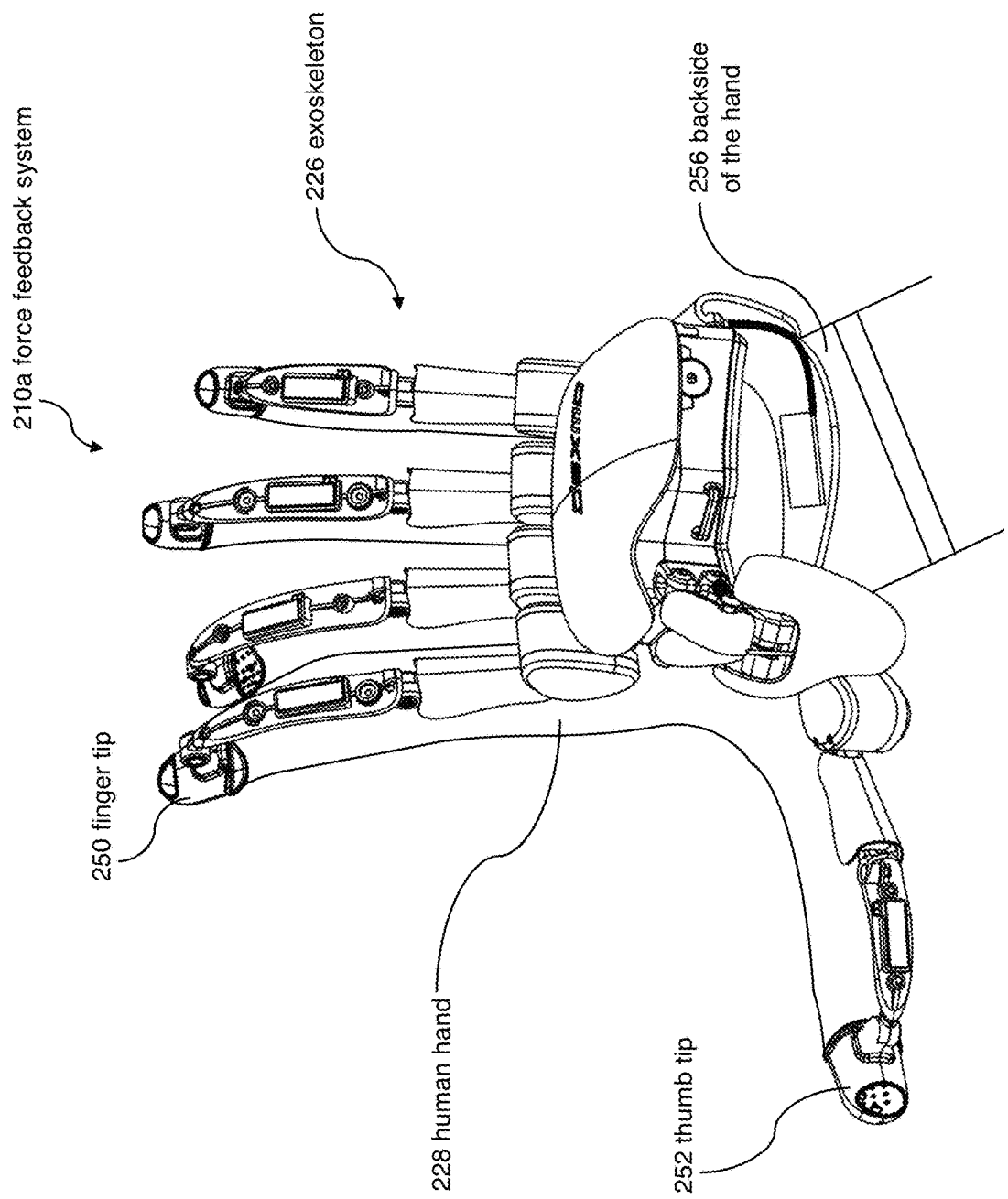
FIGS. 22A and 22B illustrate a force feedback system coupled to a hand of a user, according to some embodiments.
Figure 22B:
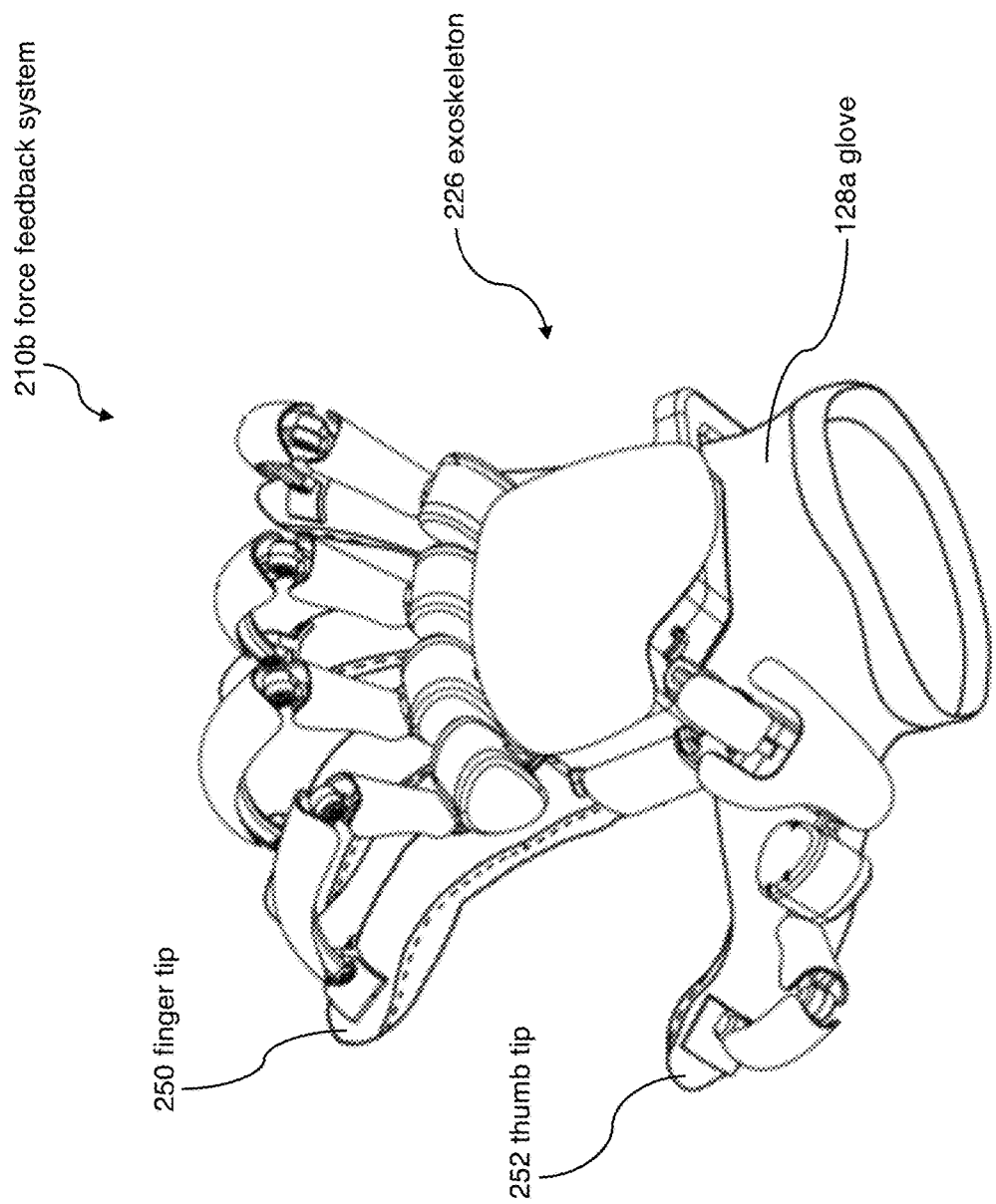

FIGS. 22A and 22B illustrate the system 210*a* coupled to a hand 228 of a user, whereby the system 210*a* is coupled directly to the user's hand (as shown in FIG. 22A) or whereby the system 210*b* is coupled to a glove 128*a*, which is thereby worn on the user's hand (i.e. the glove 128*a* is coupled to the user's hand). As shown, the base 212 is placed on the backside of the hand 256 of the user. Though not shown, in some embodiments, the palm strap 255 is wrapped around the hand 228 such that the strap 255 rests in the palm of the user. In such an embodiment, the at least one vibrational actuator 222 is in contact with the user's palm. FIGS. 22A and 22B also show how the thumb cap 244 and four finger caps 246 at least partially enclose the thumb tip 252 and finger tips 250, respectively, of the user when the user wears the system 210*a*. In some embodiments, the system 210*a* forms an exoskeleton 226 that, when worn, provides a physical stimulus, namely in the form of vibration, to the user through the use of the at least one vibrational actuator 222.

Figure 23:
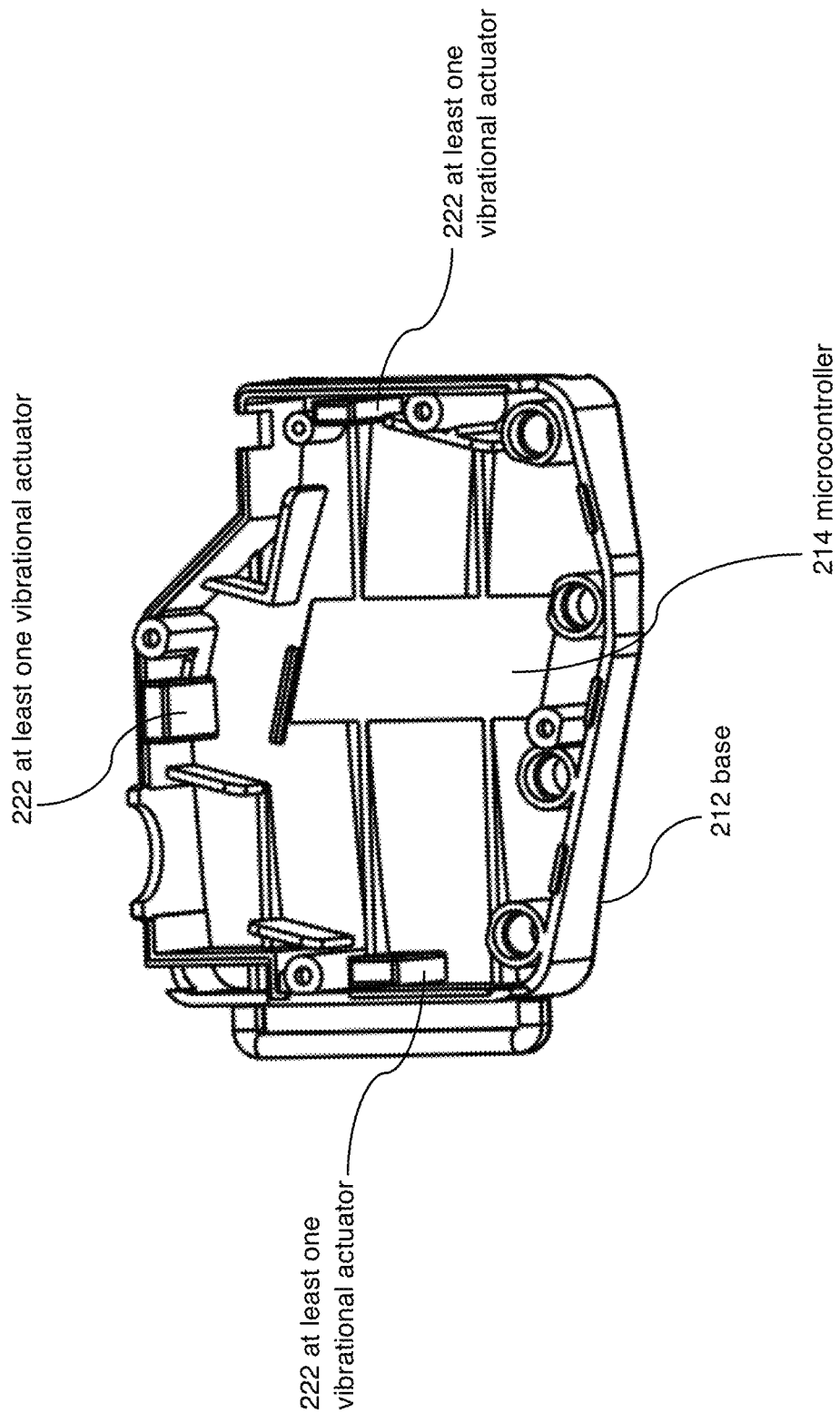
FIG. 23 illustrates a cross-section view of a base of a force feedback system, according to some embodiments.

FIG. 23 shows a perspective view of an interior portion of the base 212, according to some embodiments. The base 212 may include at least one vibrational actuator 222, as well as a microcontroller 214. In many embodiments, the microcontroller 214 is communicatively coupled to a remote computing device; for example, a tablet, smartphone, smart TV, computer, or other such device. The base 212 may also include other features not shown in FIG. 23, such as a driving chip, a power button and/or switch and the user control mechanism. As shown in FIGS. 21 and 22, the base 212 may be coupled to a palm strap 255 to enable the user to wear the system 210. The base 212 may be composed of any suitable material, including varying forms of plastic, metal, combinations thereof.

Figure 24:
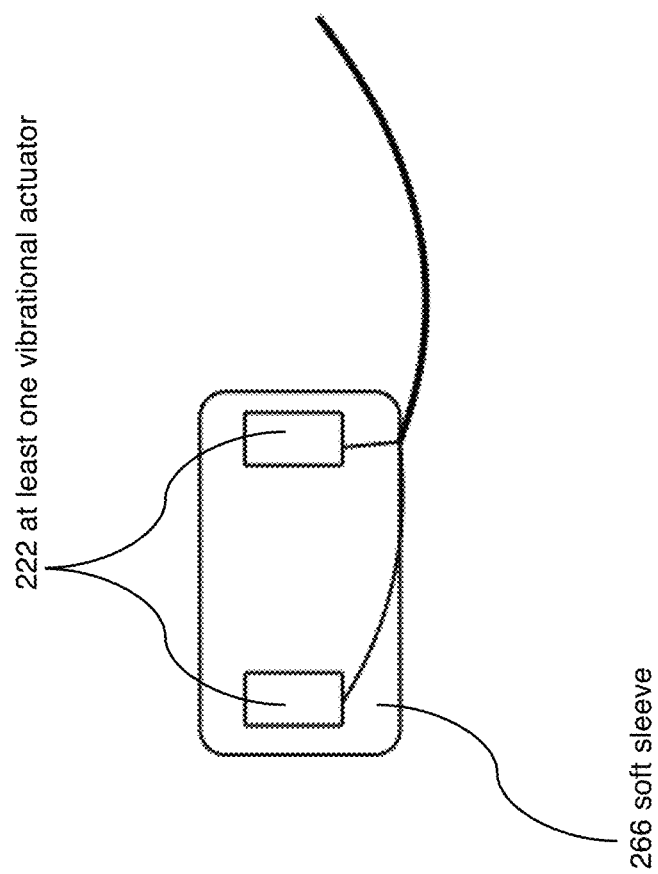
FIG. 24 illustrates at least one vibrational actuator, according to some embodiments.

FIG. 24 shows a close-up view of at least one vibrational actuator 222 at least partially contained within a soft sleeve 266. In some embodiments, and as shown in FIG. 21, the soft sleeve 266 is used to couple the at least one vibrational actuator 222 to the palm strap 255. The soft sleeve 266 and palm strap 255 may have at least one surface comprising a material such as Velcro® (or any similar such material) such that the at least one vibrational actuator 222 may be detachably coupled to the palm strap 255. Detachable coupling allows the user to adjust the position of the soft sleeve 266 on the palm strap 255 in order to achieve the most comfortable and optimal position for that user's hand size. In some embodiments, the soft sleeve 266 is detachably coupled to a different part of the system 210; for example, the soft sleeve 266 may be detachable to an underside of the base 212 to provide vibration to the backside of the user's hand 256. FIG. 24 also shows one line coming off of each of the at least one vibrational actuators 222. In some embodiments, these lines represent wires that communicatively couple the at least one vibrational actuator 222 circuitry within the base 212, including the microcontroller 214. Alternatively, the at least one vibrational actuator 222 may be communicatively coupled to the circuitry within the base 212 through wireless means. In some embodiments, multiple soft sleeves 266 may be included in the system 210 in order to increase the stimulus and/or provide the stimulus to a greater surface area of the user's hand.

Figures 25A, 25B:
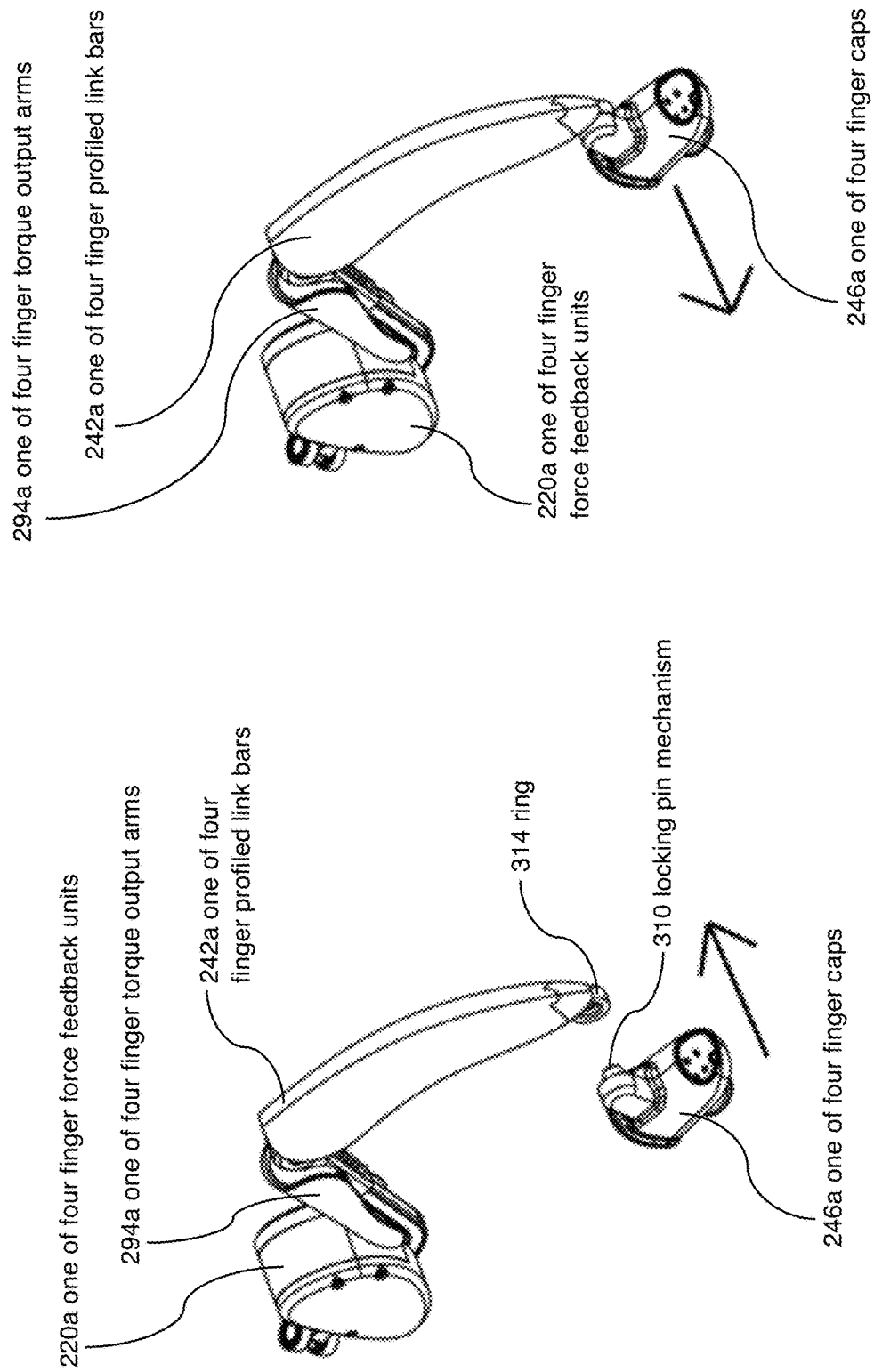
FIGS. 25A and 25B illustrate perspective views of a portion of a force feedback system showing the four finger caps being detachable from the force feedback system, according to some embodiments.

FIGS. 25A-B illustrate yet another aspect of the invention whereby the finger caps 246 and thumb caps 244 are detachable from the system. FIG. 25A shows one of four finger caps 246*a* detached from a finger segment of the system 210, while FIG. 25B shows one of four finger caps 246*a* coupled to the finger segment. FIG. 25A also includes a locking pin mechanism 310 and ring 314, both of which will be discussed in more detail with reference to FIGS. 26 and 27. The detachable nature of the thumb cap 244 and four finger caps 246 allows the user to change caps in order to achieve the best fit for an optimal user experience. The ability to exchange the thumb and finger caps 244, 246 for ones of a different size also enables multiple users to share one system 210 and simply select the most appropriate cap size for each user. As shown in FIGS. 25A and 25B, the one of four finger caps 246*a* is detachably coupled to one of four finger profiled link bars 242*a*. The arrows in FIGS. 25A and 25B represent the direction in which the one of four finger caps 246*a* must move in order to couple or detach, respectively, from the finger segment. It should be noted that while FIGS. 25-30 and 32 refer to "finger" caps, "finger" torque output arms, "finger" profiled link bars, etc.; the figures may also apply to "thumb" caps, "thumb" torque output arms, "thumb" profiled link bars, etc.

FIGS. 26A-B show the one of four finger caps 246*a* in greater detail. The one of four finger caps 246*a* may be made of any suitable material that can be comfortably worn by the user: examples include, but are not limited to, any fabric (cotton, polyester, etc.), silicone, rubber, latex, and the like. In some embodiments, the finger caps 246 and glove 128 are constructed of conductive material, which allow the user to wear the system and still be able to work with a touch screen on a remote computing device, such as a smartphone or tablet. In some embodiments, as shown by FIGS. 21, 25A-B, and 26A-B, the one of four finger caps 246*a* may comprise an opening on the top surface 312 of the cap. This opening, as well as the smaller holes depicted on the underside of the one of four finger caps in FIGS. 26A-B, may facilitate air flow and provide a more comfortable user experience.

Figures 27A, 27B:
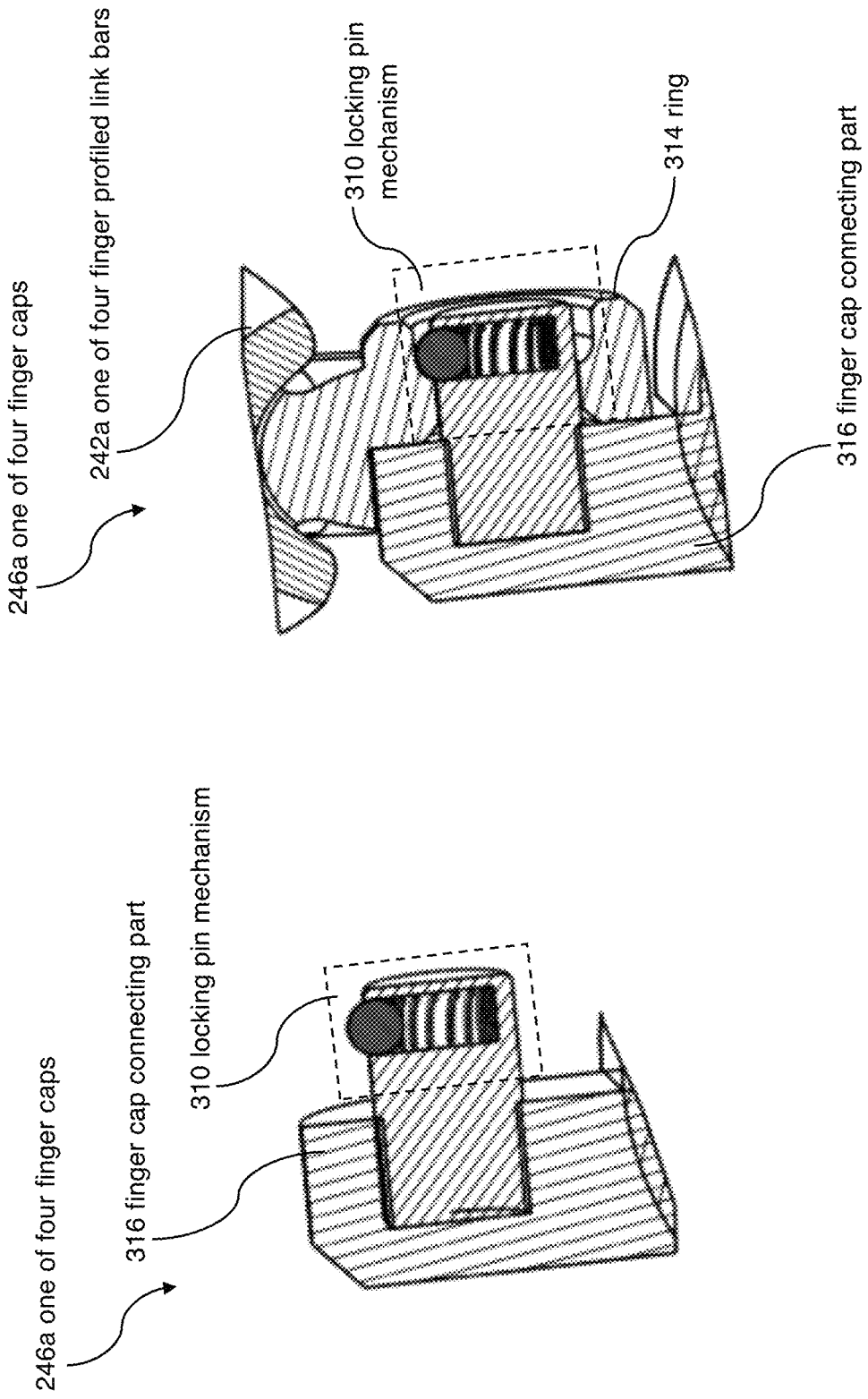
FIGS. 27A and 27B illustrate cross-section views of a locking pin mechanism of a finger cap showing the finger cap being detachable from the force feedback system, according to some embodiments.

In the embodiment shown in FIGS. 26A-B, the finger cap connecting part 316 is a rigid structure coupled to the top surface 312 of the one of four finger caps 246*a*. The finger cap connecting part 316 may include a mechanism to detachably couple the one of four finger caps 246*a* to the one of four finger profiled link bars 242*a*. The mechanism may include a friction fit, a screw, a magnet, or any other suitable mechanism. The embodiment depicted in FIGS. 26A-B shows a locking pin mechanism 310, which is configured to couple to a ring 314 of the one of four finger profiled link bars 242*a*. FIGS. 27A-B both show cross-sectional views of the locking pin mechanism 310, and FIG. 27B shows the locking pin mechanism 310 coupled to the ring 314 of the one of four finger profiled link bars 242*a*. When the locking pin mechanism 310 is coupled to the ring 314, the coupling may be such that the one of four finger caps 246*a* is able to rotate relative to the one of four finger profiled link bars 242*a*. This rotation may be possible in some embodiments because the locking pin mechanism 310 is able to rotate inside the ring 314 without disengaging from the ring 314.

In some embodiments, the darker vertical portion of the locking pin mechanism 310 is a vertical spring configured to compress during initial insertion of the locking pin mechanism 310 into the ring 314, then expand to couple the locking pin mechanism 310 to the ring 314. The vertical spring may include a locking ball located on top of the spring. In some embodiments, the ring 314 is comprised of a narrow ring within a wider ring. The vertical spring may compress when the locking ball comes into contact with the narrow ring, allowing the locking pin mechanism 310 to slide into the ring 314, then expand once the mechanism 310 slides past the narrow ring so that the locking ball comes into contact with the wider ring to achieve coupling. In some embodiments, the locking pin mechanism 310 is detached from the ring 314 by applying force to pull the one of four finger caps 246a in the opposite direction of installation, such as pulling the respective finger cap 246 in the direction of the arrow shown in FIG. 25B. The vertical spring may compress again when the locking ball comes into contact with the narrow ring, and the locking pin mechanism 310 (and therefore the one of four finger caps 246a) is released from the ring 314.

FIGS. 28A and 28B illustrate an embodiment of the locking pin mechanism 310. FIG. 28A shows one of four finger caps 246a coupled to a finger cap installation base 318, which includes the locking pin mechanism 310. In contrast to the embodiment shown in FIGS. 26 and 27, the locking pin mechanism 310 of FIGS. 28A-B includes an installation chamber 320 configured to receive a locking pin, and the locking pin mechanism 310 couples to a finger cap connecting part 316, rather than a ring 314. Though not shown in FIG. 28A, the one of four finger caps 246a may include an opening on the top surface 312 similar to the embodiments shown in FIGS. 21, 22, 25, and 26. In addition, though FIG. 28B depicts the finger cap installation base 318 separate from the one of four finger caps 246a. In many embodiments, the finger cap installation base 318 is substantially permanently coupled to the one of four finger caps 246a.

Figures 29A, 29B:
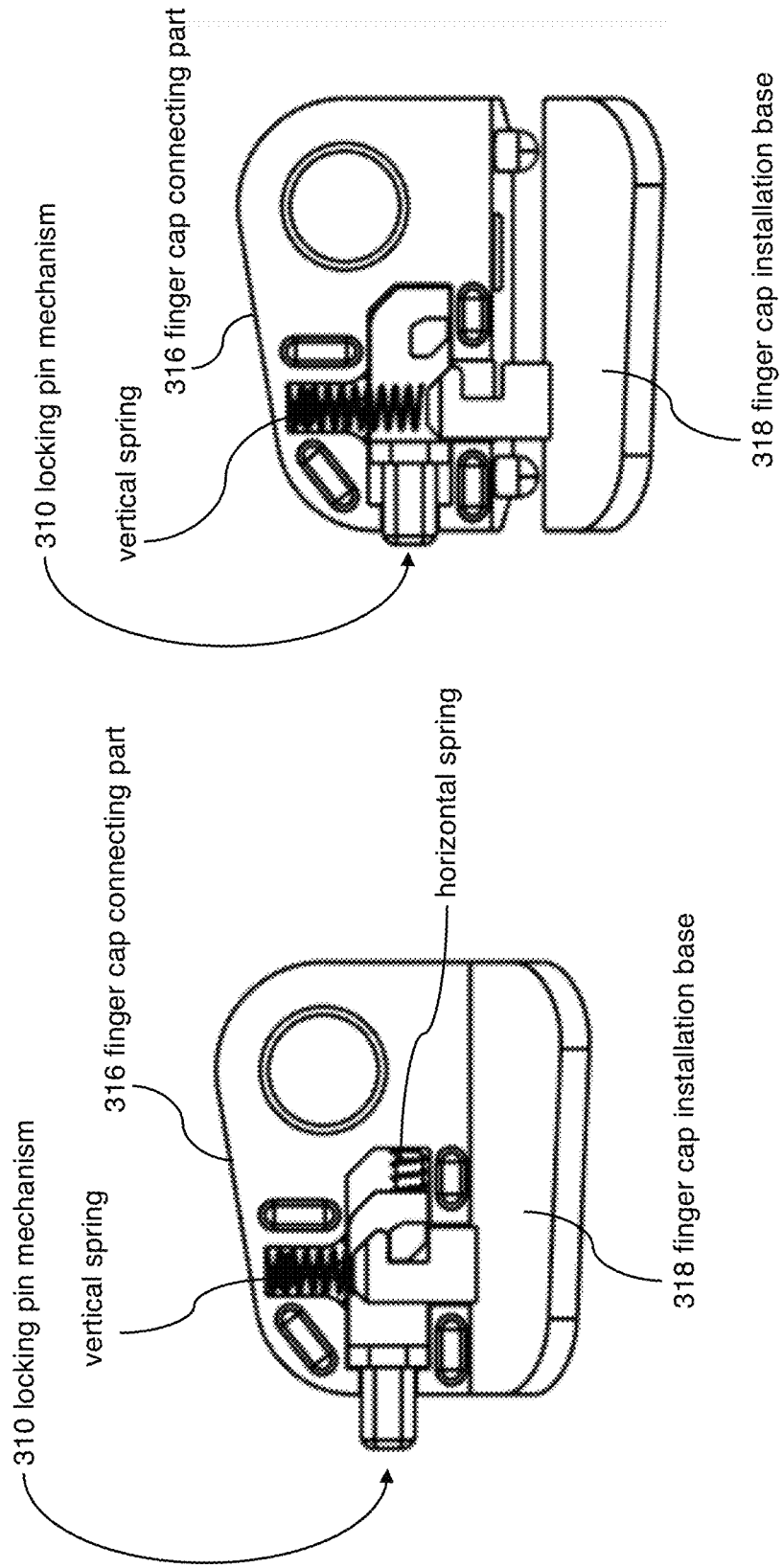
FIGS. 29A and 29B illustrate cross-section views of a locking pin mechanism of a finger cap, according to some embodiments.
Figure 30B:
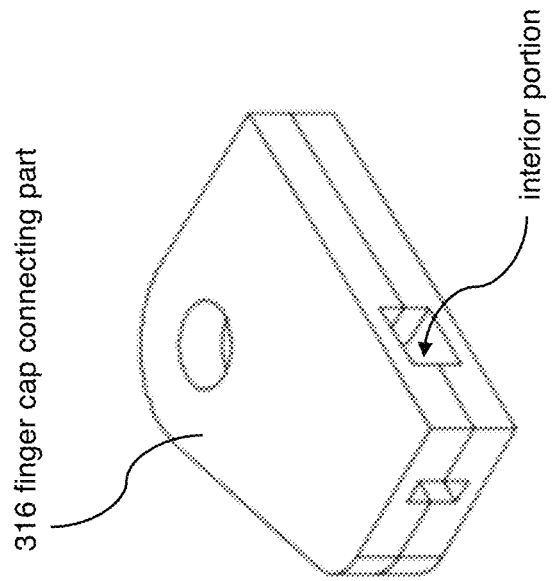
FIGS. 30A and 30B illustrate perspective views of a finger cap connecting part, according to some embodiments.
Figure 30A:
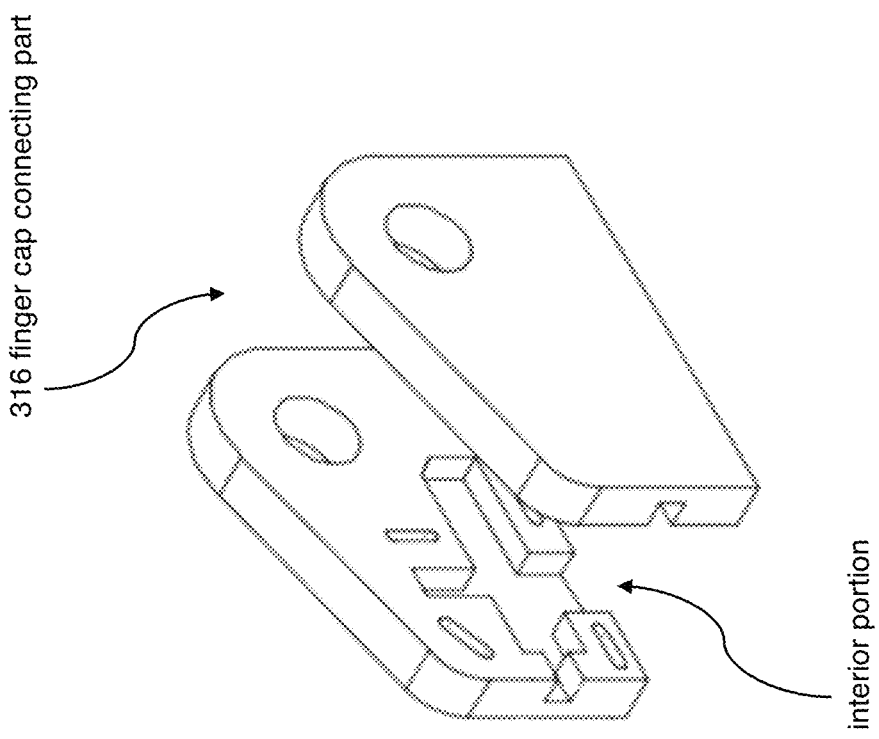

FIGS. 29A-B illustrate cross-sectional views of the locking pin mechanism 310 coupled (FIG. 29A) and decoupled (FIG. 29B) (also referred to as attached and detached, respectively) from the finger cap connecting part 316. FIG. 29A shows that, when the locking pin mechanism 310 is coupled to the finger cap connecting part 316, vertical and horizontal springs are compressed within the finger cap connecting part 316 and the locking pin mechanism 310 fits into an interior portion of the finger cap connecting part 316 (see FIG. 30A). In some embodiments, the locking pin mechanism 310 is detached from the finger cap connecting part 316 by depressing a button on the locking pin mechanism 310, which removes the installation chamber 320 from connection with the locking pin and allows the vertical and horizontal springs to expand and push the finger cap installation base 318 out of the finger cap connecting part 316. In some embodiments, only the vertical spring expands and pushes the finger cap installation base 318. FIGS. 30A-B illustrate the finger cap connecting part 316 without the locking pin mechanism 310. As seen in FIG. 30A, the finger cap connecting part 316 includes an interior portion configured to receive the locking pin mechanism 310 of the finger cap installation base 318 of the one of four finger caps 246a.

Figure 31:
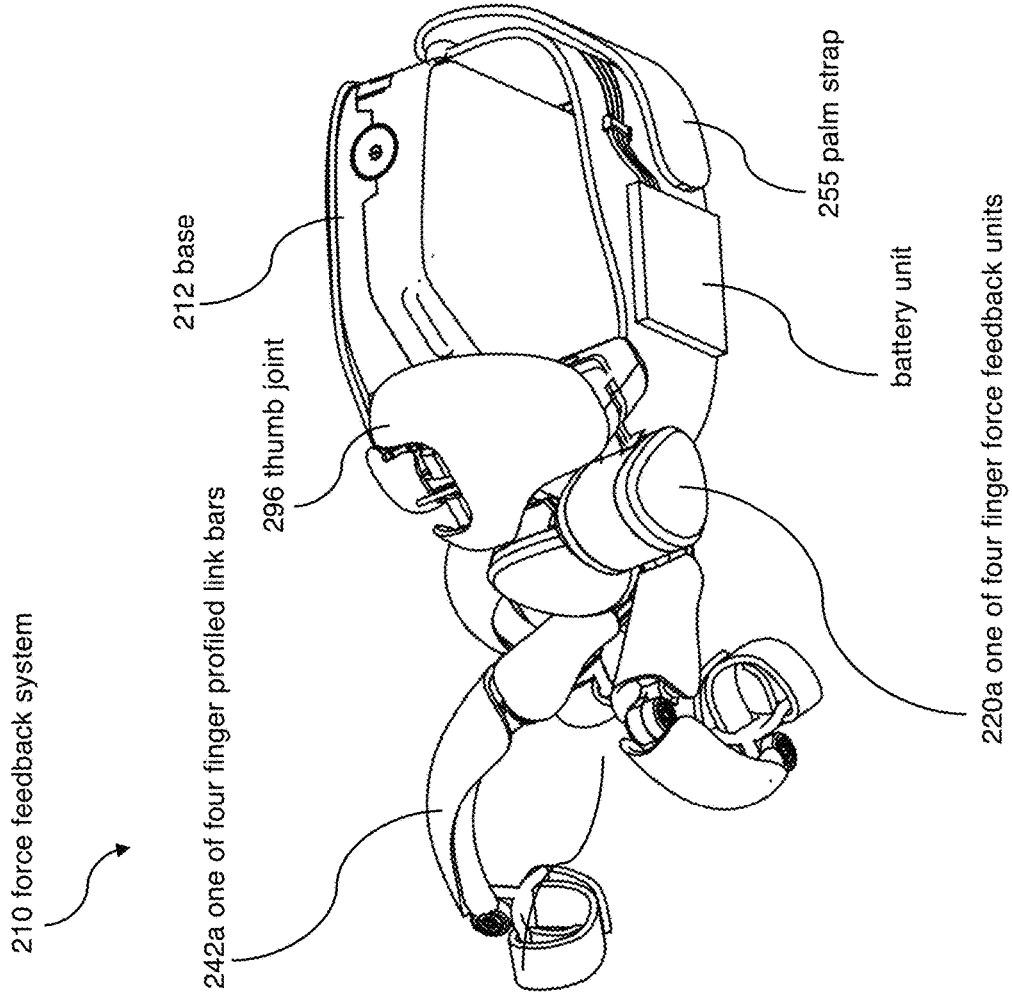
FIG. 31 illustrates a perspective view of a force feedback system, according to some embodiments.

FIG. 31 shows a perspective view of the force feedback system 210, including a battery unit. In the embodiment shown in FIG. 31, the battery unit is coupled to the bottom of the palm strap 255. In some embodiments, the battery is located on or adjacent to the user's wrist. Even still, in some embodiments, the battery is coupled to the user's wrist via an additional strap, such as a wrist strap coupled to the base and configured to wrap around a wrist of a user. However, the battery unit may be coupled to any other appropriate part of the system 210, for example, on the base 212. The battery unit may be a detachable battery unit in a manner similar to the soft sleeve 266 of the at least one vibrational actuator 222 discussed with reference to FIG. 24, at least in terms of the use of hook and loop fastener or a similar material. Some advantages of the detachable aspect of the battery unit may include ease of battery replacement and even distribution of mass of the system 210 around the user's hand, particularly when the battery unit is coupled to the bottom of the palm strap 255. Also shown in FIG. 31 are a plurality of cables extending from the battery unit. In many embodiments, the cables connect the battery unit to the main circuitry of the system 210, which may be contained within the base 212. The battery unit may be configured to detach from the cables to facilitate changing the battery.

Figures 32A, 32B:
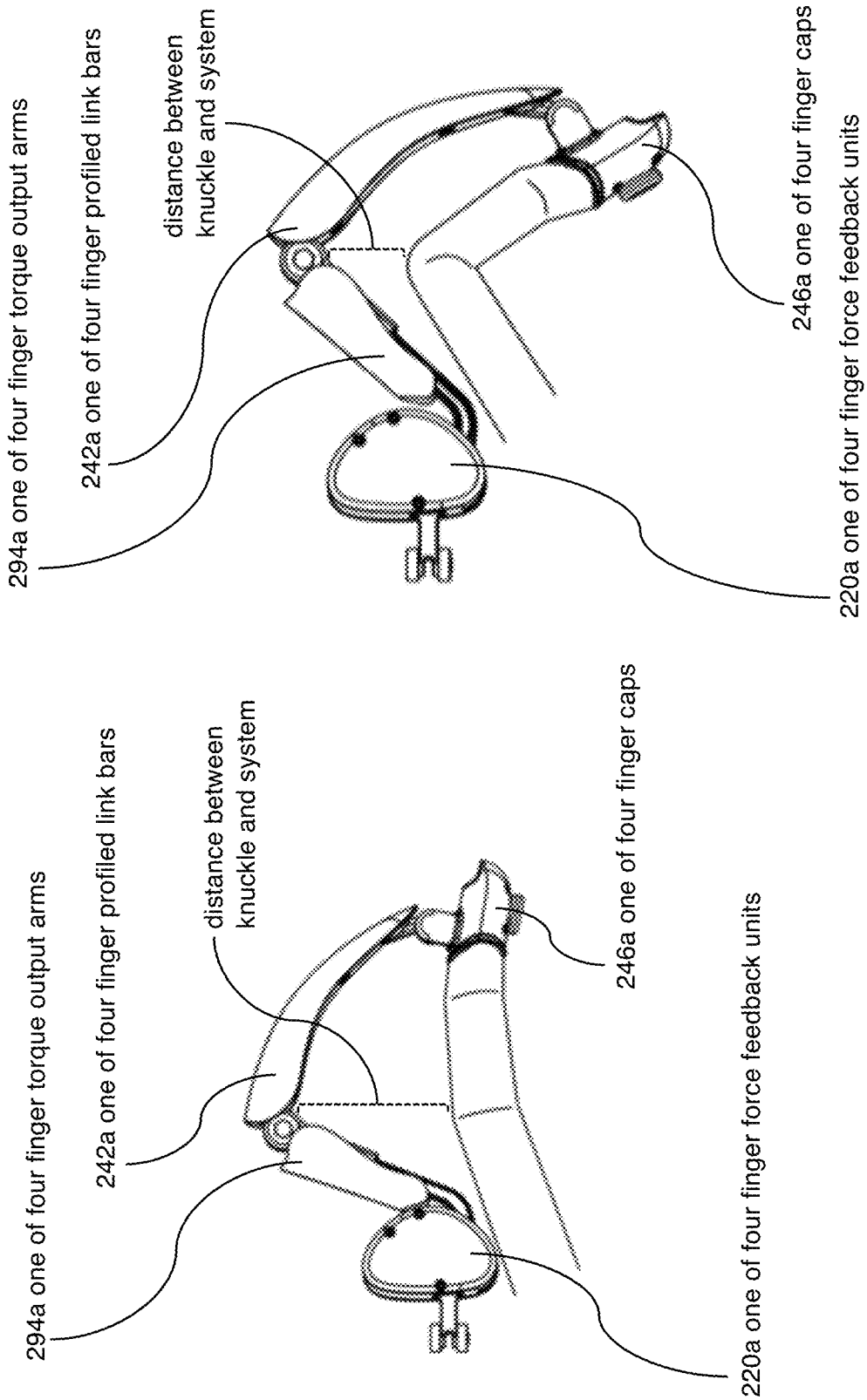
FIGS. 32A and 32B illustrate perspective views of a portion of a force feedback system coupled to a finger and showing the distance between the profiled link bar and a knuckle of a user, according to some embodiments.

FIGS. 32A-B illustrate a finger portion of the system 210 coupled to a finger of the user. FIGS. 32A-B include components present in other figures, including the one of four finger force feedback units 220a, one of four finger torque output arms 294a, one of four finger profiled link bars 242a, and one of four finger caps 246a. FIGS. 32A-B show the change in the distance between a knuckle of the user's finger and the system 210 when the user bends the finger. In the unbent state of the finger, as shown by FIG. 32A, the distance between the knuckle and the system 210 is greater than the distance when the finger is bent, as shown in FIG. 32B. In many embodiments, the distance is measured by a proximity sensor and can be used to calculate rotation of the user's finger and the system 210, which in turn facilitates motion capture of the finger. The use of a proximity sensor demonstrates yet another difference over the prior art, where many existing force feedback exoskeleton devices use rotational sensor(s).

The proximity sensor may use infrared sensing, electromagnetic fields, a beam of electromagnetic radiation emitting and sensing, optical/depth sensing, or any other suitable sensing method. The system 210 may employ a plurality of proximity and/or rotational sensors to facilitate motion capture; for example, the system 210 may include a proximity sensor for all three joints in each finger, as well as both joints in the thumb, of the user's hand. In some embodiments, the proximity sensor(s) is located in one of the four finger torque output arms 294a and/or thumb torque output arm 280. In some embodiments, the proximity sensor(s) is located in one of the four finger profiled link bars 242a and/or thumb profiled link bar 240. Alternatively, the system 210 may use one or two sensors per finger (only one for the thumb), or a varying number for each finger. In some embodiments, the system 210 uses a combination of proximity sensor(s) and rotational sensor(s) to facilitate motion capture. Moreover, in some embodiments, the rotational sensor(s) are located within any of the connection bolts 20, third potentiometer 22, and force feedback unit 220.

Interpretation

For the purposes of this disclosure, the term "substantially" should be understood to mean for the most part or to a great or significant extent. As well, the terms "movable" or "movably" can also mean "unfixed" or "unfixedly," meaning that it is able to be moved and not fixed.

None of the steps or limitations described herein is essential or indispensable. Any of the steps or limitations can be adjusted or modified. Other or additional steps and/or limitations can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computer, processor, or machine configured to execute computer instructions. The code modules may be stored on any type of non-transitory computer-readable storage medium or tangible computer storage device, such as a hard drive solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. A force feedback system, comprising:
   a base;
   a microcontroller coupled to the base and communicatively coupled to a computing device;
   a thumb force feedback unit mechanically coupled to the base and communicatively coupled to the microcontroller, the thumb force feedback unit configured to capture thumb motion and provide force feedback according to input from the computing device, the thumb force feedback unit including a thumb housing, a thumb rotational sensor, a thumb microcontroller, a thumb transmission gear box, a thumb motor, a thumb vibrational actuator, a thumb torque output arm, and a thumb profiled link bar;
   a thumb cap detachably coupled to the thumb force feedback unit;
   four finger force feedback units each mechanically coupled to the base and communicatively coupled to the microcontroller, each of the four finger force feedback units configured to capture finger motion and provide force feedback according to input from the computing device, the four finger force feedback units including four finger housings, four rotational sensors, four finger microcontrollers, four finger transmission gear boxes, four finger motors, four finger vibrational actuators, four finger torque output arms, and four finger profiled link bars; and
   four finger caps each detachably coupled to each of the four finger force feedback units.

2. The force feedback system of claim 1, wherein the thumb force feedback unit is configured to rotate both side to side and up and down with respect to the base.

3. The force feedback system of claim 1, further comprising a thumb joint mechanically coupled to the base and the thumb force feedback unit such that the thumb joint is located between the thumb force feedback unit and the base, wherein the thumb joint is configured to rotate up and down with respect to the base and restricted from rotating side to side with respect to the base, wherein the thumb force feedback unit is configured to rotate side to side with respect to the thumb joint and restricted from rotating up and down with respect to the thumb joint.

4. The force feedback system of claim 1, wherein the thumb torque output arm is coupled to the thumb force feedback unit and is configured to rotate up and down with respect to the thumb force feedback unit and restricted from rotating side to side with respect to the thumb force feedback unit, and wherein the four finger torque output arms are coupled to the four finger force feedback units and are configured to rotate up and down with respect to each of the four finger force feedback units and restricted from rotating side to side with respect to each of the four finger force feedback units.

5. The force feedback system of claim 4, wherein the thumb profiled link bar is coupled to the thumb torque output arm and is configured to rotate up and down with respect to the thumb torque output arm and restricted from rotating side to side with respect to the thumb torque output arm, and wherein the four finger profiled link bars are coupled to the four finger torque output arms and are configured to rotate up and down with respect to the four finger torque output arms and are restricted from rotating side to side with respect to the four finger torque output arms, wherein the thumb profiled link bar is configured to slide with respect to the thumb torque output arm and restricted from rotating with respect to the thumb torque output arm, and wherein the four finger profiled link bars are each configured to slide with respect to the four finger torque output arms and are restricted from rotating with respect to the four finger torque output arms.

6. The force feedback system of claim 1, further comprising a plurality of proximity sensors coupled to at least one of the thumb housing, thumb rotational sensor, thumb microcontroller, thumb transmission gear box, thumb motor, thumb vibrational actuator, thumb torque output arm, thumb profiled link bar, four finger housings, four rotational sensors, four finger microcontrollers, four finger transmission gear boxes, four finger motors, four finger vibrational actuators, four finger torque output arms, and the four finger profiled link bars.

7. The force feedback system of claim 1, wherein the thumb cap is detachably coupled to the thumb profiled link bar and is configured to rotate up and down with respect to the thumb profiled link bar and restricted from rotating side to side with respect to the thumb profiled link bar, and the four finger caps are detachably coupled to each of the four finger profiled link bars and are configured to rotate up and down with respect to the four finger profiled link bars and restricted from rotating side to side with respect to the four finger profiled link bars, wherein the thumb cap is configured to at least partially enclose a thumb of a user and the four finger caps are configured to at least partially enclose four fingers of the user, wherein the thumb cap is detachably coupled to the thumb profiled link bar via at least one of a friction fit, a screw, and a magnet, and the four finger caps are detachably coupled to the four finger profiled link bars via at least one of the friction fit, the screw, and the magnet, and wherein the friction fit comprises a locking pin mechanism coupled to a top surface of the thumb cap and the four finger caps, and the locking pin mechanism mechanically couples to a ring coupled to the thumb profiled link bar and the four finger profiled link bars.

8. The force feedback system of claim 1, wherein the thumb cap and the four finger caps comprise a variety of sizes configured to fit a variety of users.

9. A force feedback system, comprising:
a base;
a microcontroller coupled to the base and communicatively coupled to a computing device;
a thumb force feedback unit mechanically coupled to the base and communicatively coupled to the microcontroller, the thumb force feedback unit configured to capture thumb motion and provide force feedback according to input from the computing device, the thumb force feedback unit including a thumb housing, a thumb rotational sensor, a thumb microcontroller, a thumb transmission gear box, a thumb motor, a thumb vibrational actuator, a thumb torque output arm, and a thumb profiled link bar;
a thumb cap detachably coupled to the thumb force feedback unit;
four finger force feedback units each mechanically coupled to the base and communicatively coupled to the microcontroller, each of the four finger force feedback units configured to capture finger motion and provide force feedback according to input from the computing device, the four finger force feedback units including four finger housings, four rotational sensors, four finger microcontrollers, four finger transmission gear boxes, four finger motors, four finger vibrational actuators, four finger torque output arms, and four finger profiled link bars;
four finger caps each detachably coupled to each of the four finger force feedback units; and
a plurality of proximity sensors coupled to at least one of the thumb housing, thumb rotational sensor, thumb microcontroller, thumb transmission gear box, thumb motor, thumb vibrational actuator, thumb torque output arm, thumb profiled link bar, four finger housings, four rotational sensors, four finger microcontrollers, four finger transmission gear boxes, four finger motors, four finger vibrational actuators, four finger torque output arms, and the four finger profiled link bars.

10. The force feedback system of claim 9, wherein the thumb force feedback unit is configured to rotate both side to side and up and down with respect to the base.

11. The force feedback system of claim 9, further comprising a thumb joint mechanically coupled to the base and the thumb force feedback unit such that the thumb joint is located between the thumb force feedback unit and the base, wherein the thumb joint is configured to rotate up and down with respect to the base and restricted from rotating side to side with respect to the base, wherein the thumb force feedback unit is configured to rotate side to side with respect to the thumb joint and restricted from rotating up and down with respect to the thumb joint.

12. The force feedback system of claim 9, wherein the thumb torque output arm is coupled to the thumb force feedback unit and is configured to rotate up and down with respect to the thumb force feedback unit and restricted from rotating side to side with respect to the thumb force feedback unit, and wherein the four finger torque output arms are coupled to the four finger force feedback units and are configured to rotate up and down with respect to each of the four finger force feedback units and restricted from rotating side to side with respect to each of the four finger force feedback units.

13. The force feedback system of claim 12, wherein the thumb profiled link bar is coupled to the thumb torque output arm and is configured to rotate up and down with respect to the thumb torque output arm and restricted from rotating side to side with respect to the thumb torque output arm, and wherein the four finger profiled link bars are coupled to the four finger torque output arms and are configured to rotate up and down with respect to the four finger torque output arms and are restricted from rotating side to side with respect to the four finger torque output arms, wherein the thumb profiled link bar is configured to slide with respect to the thumb torque output arm and restricted from rotating with respect to the thumb torque output arm, and wherein the four finger profiled link bars are each configured to slide with respect to the four finger torque output arms and are restricted from rotating with respect to the four finger torque output arms.

14. The force feedback system of claim 9, wherein the thumb cap is detachably coupled to the thumb profiled link bar and is configured to rotate up and down with respect to the thumb profiled link bar and restricted from rotating side to side with respect to the thumb profiled link bar and the four finger caps are detachably coupled to each of the four finger profiled link bars and are configured to rotate up and down with respect to the four finger profiled link bars and restricted from rotating side to side with respect to the four finger profiled link bars, wherein the thumb cap is configured to at least partially enclose a thumb of a user and the four finger caps are configured to at least partially enclose four fingers of the user, wherein the thumb cap is detachably coupled to the thumb profiled link bar via at least one of a friction fit, a screw, and a magnet, and the four finger caps are detachably coupled to the four finger profiled link bars via at least one of the friction fit, the screw, and the magnet, and wherein the friction fit comprises a locking pin mechanism coupled to a top surface of the thumb cap and the four finger caps, and the locking pin mechanism mechanically couples to a ring coupled to the thumb profiled link bar and the four finger profiled link bars.

15. The force feedback system of claim 1, wherein the thumb cap and the four finger caps comprise a variety of sizes configured to fit a variety of users.

16. A force feedback system, comprising:
a base;
a microcontroller coupled to the base and communicatively coupled to a computing device;
a thumb force feedback unit mechanically coupled to the base and communicatively coupled to the microcontroller, the thumb force feedback unit configured to capture thumb motion and provide force feedback according to input from the computing device;
a thumb cap detachably coupled to the thumb force feedback unit and a thumb profiled link bar, the thumb cap configured to rotate up and down with respect to the thumb profiled link bar and restricted from rotating side to side with respect to the thumb profiled link bar,
four finger force feedback units each mechanically coupled to the base and communicatively coupled to the microcontroller, each of the four finger force feedback units configured to capture finger motion and provide force feedback according to input from the computing device; and
four finger caps each detachably coupled to a respective four finger force feedback unit of the four finger force feedback units, the four finger caps each detachably coupled to a respective four finger profiled link bar of the four finger profiled link bars, the four finger caps configured to rotate up and down with respect to the four finger profiled link bars and restricted from rotating side to side with respect to the four finger profiled link bars, wherein the thumb cap is configured to at least partially enclose a thumb of a user and the four finger caps are configured to at least partially enclose four fingers of the user, wherein the thumb cap is detachably coupled to the thumb profiled link bar via at least one of a friction fit, a screw, and a magnet, and the four finger caps are detachably coupled to the four finger profiled link bars via at least one of the friction fit, the screw, and the magnet, and wherein the friction fit comprises a locking pin mechanism coupled to a top surface of the thumb cap and the four finger caps, and the locking pin mechanism mechanically couples to a ring coupled to the thumb profiled link bar and the four finger profiled link bars.

17. The force feedback system of claim 16, wherein the thumb force feedback unit is configured to rotate both side to side and up and down with respect to the base.

18. The force feedback system of claim 16, further comprising a thumb joint mechanically coupled to the base and the thumb force feedback unit such that the thumb joint is located between the thumb force feedback unit and the base, wherein the thumb joint is configured to rotate up and down with respect to the base and restricted from rotating side to side with respect to the base, wherein the thumb force feedback unit is configured to rotate side to side with respect to the thumb joint and restricted from rotating up and down with respect to the thumb joint.

19. The force feedback system of claim 16, wherein the thumb torque output arm is coupled to the thumb force feedback unit and is configured to rotate up and down with respect to the thumb force feedback unit and restricted from rotating side to side with respect to the thumb force feedback unit, and wherein the four finger torque output arms are coupled to the four finger force feedback units and are configured to rotate up and down with respect to each of the four finger force feedback units and restricted from rotating side to side with respect to each of the four finger force feedback units.

20. The force feedback system of claim 19, wherein the thumb profiled link bar is coupled to the thumb torque output arm and is configured to rotate up and down with respect to the thumb torque output arm and restricted from rotating side to side with respect to the thumb torque output arm, and wherein the four finger profiled link bars are coupled to the four finger torque output arms and are configured to rotate up and down with respect to the four finger torque output arms and are restricted from rotating side to side with respect to the four finger torque output arms, wherein the thumb profiled link bar is configured to slide with respect to the thumb torque output arm and restricted from rotating with respect to the thumb torque output arm, and wherein the four finger profiled link bars are each configured to slide with respect to the four finger torque output arms and are restricted from rotating with respect to the four finger torque output arms.

* * * * *